(12) United States Patent
Park et al.

(10) Patent No.: US 10,491,299 B2
(45) Date of Patent: Nov. 26, 2019

(54) ELECTRONIC DISPERSION COMPENSATION METHODS AND IMPLEMENTATIONS USING RLC FILTER SYNTHESIS

(71) Applicant: OE Solutions America, Inc., Ridgefield Park, NJ (US)

(72) Inventors: Moon Soo Park, Irvine, CA (US); Jiwon Jang, Irvine, CA (US); Wanseok Seo, Irvine, CA (US); Daejin Kim, Irvine, CA (US); Bongsin Kwark, Irvine, CA (US)

(73) Assignee: OE SOLUTIONS AMERICA, INC., Ridgefield Park, NJ (US)

( * ) Notice: Subject to any disclaimer, the term of this patent is extended or adjusted under 35 U.S.C. 154(b) by 0 days.

(21) Appl. No.: 15/458,937

(22) Filed: Mar. 14, 2017

(65) Prior Publication Data

US 2017/0272162 A1 Sep. 21, 2017

Related U.S. Application Data

(60) Provisional application No. 62/308,218, filed on Mar. 15, 2016.

(51) Int. Cl.
*H04B 10/2507* (2013.01)
*H04B 10/69* (2013.01)
*H04B 10/2513* (2013.01)

(52) U.S. Cl.
CPC ... *H04B 10/2507* (2013.01); *H04B 10/25133* (2013.01); *H04B 10/697* (2013.01); *H04B 2210/252* (2013.01)

(58) Field of Classification Search
CPC .............. H04B 10/60–6973; H04B 10/2507
See application file for complete search history.

(56) References Cited

U.S. PATENT DOCUMENTS

| | | | |
|---|---|---|---|
| 5,481,389 A * | 1/1996 | Pidgeon | H03F 1/32 332/160 |
| 8,693,882 B2 | 4/2014 | McVey et al. | |
| 2002/0181573 A1 | 12/2002 | Dohmen et al. | |
| 2003/0011847 A1 | 1/2003 | Pacek et al. | |
| 2004/0042235 A1 * | 3/2004 | Fukuoka | H04B 10/2513 363/8 |
| 2004/0179849 A1 | 9/2004 | Miyazaki et al. | |

(Continued)

*Primary Examiner* — Casey L Kretzer
(74) *Attorney, Agent, or Firm* — Ichthus International Law PLLC

(57) ABSTRACT

A method and apparatus for compensating optical dispersion over an optical fiber are provided in fiber optic communications to increase a transmission distance by overcoming the optical dispersion caused by wavelength changes of light sources and dispersion effects of a fiber. In one implementation, the present technology may be implemented in the form of a RLC passive microwave filter with no extra power consumption. By way of example, an optical receiver may include a photodiode operable to receive an optical signal and produce an electrical signal, a transimpedance amplifier (TIA) operable to receive the electrical signal and produce a first amplified signal, and an electronic dispersion compensation (EDC) device operable to receive the first amplifier signal from the TIA and compensate or reduce the effects of optical dispersion on the received electrical signal.

11 Claims, 21 Drawing Sheets

(56) References Cited

U.S. PATENT DOCUMENTS

| | | |
|---|---|---|
| 2004/0258183 A1 | 12/2004 | Popescu et al. |
| 2006/0067699 A1 | 3/2006 | Chandrasekhar et al. |
| 2006/0078336 A1 | 4/2006 | McNicol et al. |
| 2006/0115279 A1* | 6/2006 | Moran .................. H04B 10/502 398/182 |
| 2006/0159462 A1* | 7/2006 | Aronson ............ H04B 10/2513 398/138 |
| 2007/0177884 A1* | 8/2007 | Kagaya .................. H03F 3/087 398/202 |
| 2008/0247452 A1 | 10/2008 | Lee |
| 2008/0298801 A1 | 12/2008 | King et al. |
| 2009/0016737 A1 | 1/2009 | McVey et al. |
| 2009/0245309 A1* | 10/2009 | Khalouf ............. H04B 10/6972 372/38.02 |
| 2012/0219300 A1* | 8/2012 | Chen .................... G02B 6/4246 398/135 |
| 2013/0209089 A1* | 8/2013 | Harley ............... H04B 10/5561 398/25 |
| 2015/0362677 A1 | 12/2015 | Wang et al. |
| 2016/0050023 A1 | 2/2016 | Kaneda et al. |
| 2016/0261352 A1* | 9/2016 | Wen ..................... H04B 10/532 |

* cited by examiner

ELECTRONIC DISPERSION COMPENSATION METHODS AND IMPLEMENTATIONS USING RLC FILTER SYNTHESIS

CROSS REFERENCE TO RELATED APPLICATION(S)

This application claims priority to U.S. Provisional Application No. 62/308,218 filed Mar. 15, 2016, titled "Electronic Dispersion Compensation Methods and Implementations using RLC Filter Synthesis," the content of which is incorporated herein by reference in its entirety.

TECHNICAL FIELD

The present disclosure relates to design and implementation of electronic dispersion compensation (EDC) using passive electronic components such as registers, inductors and/or capacitors in a cost effective and power efficient manner.

BACKGROUND

With advances in technology and more demand of increased data, customers need 10 Gb/s coarse wavelength division multiplexing (CWDM) optical transceivers that consume low power to fit into existing wireless communications systems that have been deployed in field. The term "CWDM" as used herein refers to a coarse wavelength division multiplexing technology. It is a method of combining multiple signals on laser beams at various wavelengths for transmission over optical fiber, and a number of channels of CWDM technology is fewer than that of dense wavelength division multiplexing (DWDM) technology, but more than standard wavelength division multiplexing (WDM) techniques, which is used to carry multiple signals on a single optical fiber by using different wavelengths for each signal. DWDM technology is mostly used in the long haul network segment, while WDM as well as CWDM technology are used to help carrier companies to maximize their network capacity in the access, metro, and regional network segments.

For optical transmission, certain types of lasers such as directly modulated lasers (DMLs) or electro-absorption modulated lasers (EMLs) are used for a long distance of 2 km to 80 km. Generally, DMLs use distributed feedback structure with a diffraction grating in the waveguide for direct modulation, and are often used for relatively lower speeds, less than 25 Gb/s, and shorter reaches, 2-10 km in telecommunication and data communication applications because of its large chromatic dispersion, lower frequency response, and low extinction ratio, compared to EMLs. On the other hand, an EML is a laser diode integrated with an electro-absorption modulator in a single chip. In the EML, laser properties are not changed by a process of modulation, and thus the EML is advantageous in applications with higher speeds and longer distances, compared to a DML. That is, an EML is mostly used for higher speeds and longer reaches, i.e., 10-80 km in telecommunications and data communication applications, because of smaller chromatic dispersion with a stable wavelength under high speed operation. A DML may be implemented in a single chip, providing a compact design and low power applications. However, EMLs are more costly than DMLs and thus may not be a cost effective solution for many applications.

The term "dispersion" as used herein mean the phenomenon in which the velocity of an electromagnetic wave depends on the wavelength, that is, the phase velocity varies based on frequencies. As such, the term "dispersion" includes a more commonly known "chromatic dispersion" which is a phenomenon in which the different wavelengths or colors of a light beam arrive at their destination at slightly different times. As a result, the dispersion causes a spreading of on or off light pulse that carry digital information. One of the effects of the dispersion is to cause degradation of received electrical signals, e.g., stretch initial binary pulses of information to smear into another over a distance. The effects of the dispersion lower the bit error rate of the receiving system and limit the transmission distance. For example, the dispersion effects usually limit 1550 nm transmission distances in metro networks, e.g., 80-100 km.

With CWDM optical transceivers, for longer wavelengths, the CWDM optical transceivers require use of an EML to meet a transmission distance requirement since a DML's chirp is high and the DML based transceivers cannot support 20 km in the long wavelength region about 1500 nm. Here, the term "a chirp" includes a residual data-dependent phase modulation accompanying a desired intensity modulation. It is noted that DML's chirp may tend to broaden an optical signal spectrum and thus may lead to signal distortions caused by interactions with chromatic dispersion of fibers. Also, strong dispersive broadening of modulated signals may occur in high data rates, and thus without adequate dispersion compensation, each symbol would be broadened and overlap with a number of neighboring symbols, which results in significant inter-symbol interference and distortion of the detected signals.

As such, fiber dispersion coupled with chirp parameter of the emitting laser, e.g., DMLs, affects the optical transmission system performance. For example, the fiber dispersion causes the propagation pulses to spread and overlap, and the chirp parameter produces a wavelength shift arising from the intensity variations of the DML. As such, there have been lots of efforts to overcome the fiber dispersion issues as the transmission distance becomes longer and the data rate becomes higher when the DML based optical transceivers are used.

There are two existing categories of technology in compensating the fiber dispersion. In a first category, it is attempted to overcome the fiber dispersion in an optical domain since the fiber dispersion occurs as transmitted signals propagate through the optical fiber. Such first category of technology for compensating the fiber dispersion includes dispersion compensating fiber (DCF), fiber Bragg grating (FBG) and optical filter, etc.

In a second category, the dispersion is mitigated in an electrical domain. That is, the compensation is done by processing received electrical signals by an optical receiver. The second category of technology for compensating the fiber dispersion including techniques with complicated implementations of feed forward equalization (FFE) and/or decision feedback equalization (DFE). These compensation techniques are generally all implemented in integrated circuits (ICs) or separate chips, which are not integrated into optical transceivers because of their high power consumption and high costs in the development of an independent integrated circuit (IC) or a chip. As such, in the existing technology, the functions for compensating the fiber dispersion are implemented as part of a Serializer and Deserializer (SERDES), and installed as circuits or ICs in a line card, which is separate from the optical transceivers.

As such, there is still a further need for improved and more efficient technology for reducing or compensating optical dispersion effects on received signals, providing lower power consumption and low costs benefits.

SUMMARY

To meet a demand of low power consumption of around 1 Watts (W), optical transceivers using an externally modulated laser (EML) do not provide the above listed advantages in many applications because the typical power consumption of EML based optical transceivers will be greater than 1.5 W. On the other hand, direct modulated laser (DML) based optical transceivers will likely meet the low power consumption requirement, but present issues of optical dispersion penalty (e.g., chromatic dispersion, polarization mode dispersion, etc.) caused by optical fiber as well as by a chirp of DML based optical transceivers. Since an amount of optical dispersion is proportional to a length of optical fiber, as the transmission distance gets longer, an effect of optical dispersion will become prevalent and greater when the DML based optical transceivers are used. As a result, a quality of a received signal at a reception terminal or at a receiving optical receiver will be degraded. The present technology disclosed herein addresses these shortcomings of the DML based optical transceivers in a very cost effective and power efficient manner.

In an aspect of the present technology, the effect of optical dispersion (or fiber dispersion) that are caused by the optical fiber and the chirp of DML based optical transceivers is mitigated at the reception terminal by means of an electronic dispersion compensation (EDC) device comprising passive electronic components in the reception terminal or the optical receiver. In other words, the present technology disclosed herein provides methods and apparatuses for compensating the degraded received signals or optical dispersion due to the optical dispersion over optical transmission over a distance.

In an aspect of the present disclosure, the present technology may be implemented via design of the EDC device including simple filters, e.g., microwave filters, implemented in an optical receiver, to open up a signal eye, thereby reducing transmission errors over more than 20 km even at a wavelength of 1611 nm.

Among many other advantages of the present technology the following advantages or benefits are provided: (i) simple design and/or implementation, (ii) no extra power consumption, (iii) low cost, and (iv) flexibility of implementing the present technology in optical transceivers or using discrete passive resistors, inductors, and capacitors (RLC) devices. Furthermore, the advantages of the present technology also provide fixed design approaches based on various methodology and may be implemented as a programmable circuit design for the EDC device.

In an aspect of the present disclosure, an optical receiver includes a photodiode, a TIA, and an EDC device. The photodiode is operable to receive an optical signal and produce an electrical signal, and the TIA is operable to receive the electrical signal and produce a first amplified signal. The EDC device is operable to receive the first amplified signal from the TIA and produce a compensated signal. The EDC device includes passive electronic components configured to compensate optical dispersion in the first amplified signal. Further, the optical receiver may include a post amplifier operable to receive the compensated signal and produce a second amplified signal.

In an aspect of the present disclosure, the EDC device of the optical receiver may include an arrangement of passive electronic component configured to compensate the optical dispersion using a plurality of resistors, a plurality of capacitors, and/or a plurality of inductors. The arrangement may include a filter configured to compensate dispersion on the optical signal using a plurality of resistors, a plurality of capacitors, and/or a plurality of inductors. In another aspect, the arrangement of the EDC device may include a low-pass filter, an attenuator and a notch filter. Further, the arrangement of the EDC device may include a high-pass filter, an attenuator and a notch filter. Also, in another aspect, the notch filter may comprise a parallel resonator or a serial resonator using the passive electronic components.

In another aspect of the present disclosure, the attenuator may comprise a T-type attenuator or a PI-type attenuator using the passive electronic components.

In another aspect of the present disclosure, the EDC device may be configured to compensate for the optical dispersion in the first amplified signal using either a time domain analysis or a frequency domain analysis, and frequency response characteristics of an ideal data signal is used as a reference template.

Still in another aspect of the present disclosure, values of the passive electronic components of the arrangement may be selected based on one or more differences between a frequency response of a data signal without dispersion and a frequency response of the data signal with optical dispersion, such that the effects of the optical dispersion in the first amplified signal are substantially reduced by the EDC device.

In an aspect of the present disclosure, the optical receiver may be configured to be operable in a form-factor including small form-factor pluggable (SFP), SFP+, C form factor pluggable (CFP), 10 Gigabit small form-factor pluggable (XFP), XFP+, or the like.

In another aspect of the present disclosure, an example of an optical transceiver is provided. The optical transceiver may include a transmitter optical subassembly (TOSA), and a receiver optical subassembly (ROSA). The TOSA may be configured to receive a first electrical signal and convert the received first electrical signal into a first optical signal for transmission to another optical transceiver over optical fiber. The ROSA may be configured to receive a second optical signal from another optical transceiver over the optical fiber and convert the received second optical signal into a second electrical signal for processing. The ROSA may include a photodiode operable to receive the second optical signal and produce the second electrical signal, a transimpedance amplifier (TIA) operable to receive the second electrical signal and produce an amplified signal, and an electronic dispersion compensation (EDC) device operable to receive the amplified signal from the TIA and produce a compensated signal. The EDC device may include an arrangement of passive electronic components having a particular frequency characteristics to reduce optical dispersion in the amplified signal.

In an aspect of the present disclosure, the arrangement of passive electronic components may include a low-pass filter or a high-pass filter, an attenuator, and/or a notch filter so as to have a particular frequency response to compensate the optical dispersion in the amplified signal. Further, the attenuator may include a T-type attenuator, a bridge T-type attenuator, or a PI-type attenuator using the passive electronic components.

In another aspect of the present disclosure, the present technology may also be implemented together with either transimpedance amplifier (TIA) and/or limiting amplifier, rather than as a separate EDC device.

In another aspect of the present disclosure, the present technology may be implemented as a programmable type by monitoring an eye opening of a received electrical signal or the first amplified signal.

In another aspect, the present technology may be implemented using look-up tables (LUTs).

Further, the present technology may be implemented by monitoring input optical power to an optical receiver. The output power information may be estimated at the optical receiver or may be received from a remote optical transmitter (a remote optical transceiver or system). Also, transmission distance information may be received from the remote optical transmitter transceiver, and/or from a local system. Furthermore, the present technology may be implemented using (micro) strip line, multichip module, etc.

In another aspect of the present disclosure, low power consuming 10 Gb/s CWDM Small-Form Factor Pluggable (SFP) is supported, which is capable of transmission over 20 Km using a DML at 1611 nm. Compared to externally modulated lasers (EMLs), DMLs can support low power consumption close to 1 W in SFP form factor, and has high dispersion, i.e., having the transmitted optical signals with lots of distortion due to fiber dispersion.

In another aspect of the present disclosure, a method of compensating or reducing optical dispersion in a signal transmitted by a direct modulated laser (DML) in a remote optical transmitter is provided. At an optical receiver, an optical signal which is transmitted by the remote optical transmitter over an optical fiber is received and converted into an electrical signal. The electrical signal is them amplified into an amplified electrical signal. By means of an electronic dispersion compensation device, effects of optical dispersion in the amplified electrical signal is compensated. The EDC device includes an arrangement of passive electronic components including a plurality of resistors, a plurality of inductors, and/or a plurality of capacitors. Further, frequency characteristics of the EDC device is configured to reduce the effects of optical dispersion in the amplified electrical signal.

Further, a frequency response of the amplified electrical signal which includes effects of optical dispersion may be determined or measured. A target frequency response of the EDC device may be determined such that the target frequency response of the EDC device is configured to compensate or reduce the effects of optical dispersion in the amplified electrical signal.

In another aspect of the present disclosure, the optical dispersion in the amplified electrical signal may be estimated based on certain information including the chirp parameter of the remote optical transmitter, transmission wavelength, etc.

In another aspect of the present disclosure, the target frequency response of the EDC device may be determined based on the estimated optical dispersion in the amplified electrical signal.

In another aspect of the present disclosure, a frequency (or spectrum) response of an actual received electrical signal with dispersion effects may be determined or measured, and unwanted frequency components due to the dispersion effects may be identified in the spectrum response of the actual received electrical signal. The unwanted frequency components may be determined by comparing the spectrum response of the actual received electrical signal with dispersion effects and an ideal spectrum response of an electrical signal without dispersion effects. The determined unwanted frequency components in the actual received electrical signal are then removed by means of the EDC device comprising an arrangement of passive electronic components such as a plurality of resistors, a plurality of inductors, and/or a plurality of capacitors. The EDC device may be configured to have a particular gain frequency response so as to remove or reduce the unwanted frequency components in the spectrum of the actual received electrical signal.

BRIEF DESCRIPTION OF THE DRAWINGS

A more detailed understanding may be obtained from the following description in connection with the following accompanying drawings. It is appreciated that these drawings depict only example embodiments of the present technology and are not intended to limit its scope. The present technology will be described and explained without additional specificity through the use of the accompanying drawings in which.

DETAILED DESCRIPTION

Figure 1:
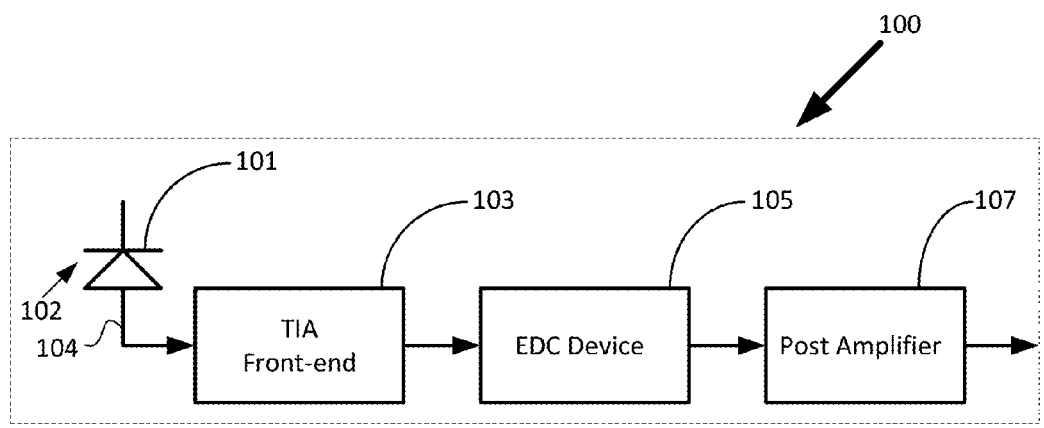
FIG. 1 is a typical block diagram conceptually illustrating an optical receiver in accordance with an aspect of the present disclosure.

The detailed description of illustrative examples will now be set forth below in connection with the various drawings. The description below is intended to be exemplary and in no way limit the scope of the present technology. It provides a detailed example of possible implementation, and is not intended to represent the only configuration in which the concepts described herein may be practiced. As such, the detailed description includes specific details for the purpose of providing a thorough understanding of various concepts, and it is noted that these concepts may be practiced without these specific details. Further, in some instances, well known structures and components are shown in block diagram form in order to avoid obscuring such concepts. It is noted that like reference numerals are used in the drawings to denote like elements and features.

In the present disclosure, methods and devices that implement example embodiments of various features of the present technology are described herein. Reference in the description herein to "one embodiment" or "an embodiment" is intended to indicate that a particular feature, structure, or characteristic described in connection with one or more example embodiments is included in at least an embodiment of the present technology or disclosure. Also, the phrases "in one embodiment" and "an embodiment" in various places in the description herein are not necessarily all referring to the same embodiment.

In the following description, although specific details are given to provide a thorough understanding of the example embodiments, it will be understood by one of ordinary skill in the art that the example embodiments may be practiced without these specific details. In some instances, well-known circuits, structures and techniques may not be shown in detail in order not to obscure the example embodiments (e.g., circuits in block diagrams, etc.).

By way of example, the present disclosure provides various techniques or methodologies for mitigating or reducing the fiber dispersion using electronic dispersion compensation (EDC) techniques based on passive filters. A first example methodology is a time domain approach and a second example methodology is a frequency domain approach. Both the time domain and frequency domain approaches make the design of EDC filter easy and practical from an engineering perspective.

FIG. 1 is a typical block diagram conceptually illustrating an optical receiver 100 including a photodetector 101, a transimpedance amplifier (TIA) front-end 103, an electronic dispersion compensation (EDC) device 105 between and a post amplifier 107. In the example, the photodetector 101 may include a photodiode such as avalanche photo diode (APD) or positive-intrinsic negative (PIN) diode configured to detect optical signals 102 and convert the detected optical signals into electrical signals 104 for output. The photodetector and/or the optical receiver 100 may be optically coupled with one or more optical fibers, other optical waveguides, or other optical transmission medium. The electrical signals 104 of the photodetector 101 are then amplified by the TIA front-end 103 with low noise. The TIA front-end 103 may include an electronic circuit or other device that is configured to perform current to voltage conversion to input to the EDC device 105, which is then processed by the post amplifier 107.

In the example, to achieve an optimum performance of the optical receiver 100, the TIA front-end 103 may be typically designed to have a bandwidth of about 75% of a bit rate (e.g., data rate) which may provide an optimum eye opening of a received optical signal (i.e., a rectangular optical signal) sent from an optical transmitter (not shown) remotely located at the other side, i.e., a transmitter side. The EDC device 105 is configured to receive the output from the TIA front-end 103, perform one or more functions relating to electronic dispersion compensation on the received electrical signals, and produce the EDC compensated electrical signals. The EDC compensated electrical signals are then post amplified by the post amplifier 107 for subsequent use by other components in an optical transceiver.

In the present description, the term "EDC device" used herein mean an arrangement or circuit of passive electronic components in a receiving terminal or device, such as a plurality of resistors, a plurality of inductors, and/or a plurality of capacitors, so as to reduce the effects of optical dispersion on an optical fiber channel over a distance. Although the EDC device in accordance with the present disclosure include the passive electronic components such as the plurality of resistors, the plurality of inductors, and/or the plurality of capacitors, the EDC device may not be limited thereto. The EDC device may include other non-passive components, e.g., active components.

Figure 2A:
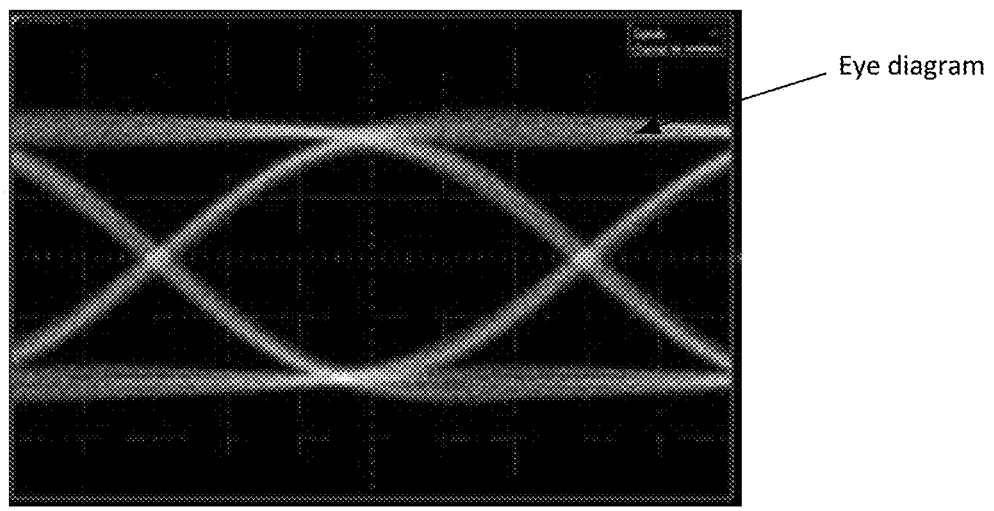
FIGS. 2A and 2B are example screen capture images of an eye diagram and its spectrum of an example of an optimum electrical signal at an output of the TIA front-end in accordance with an aspect of the present disclosure.
Figure 2B:
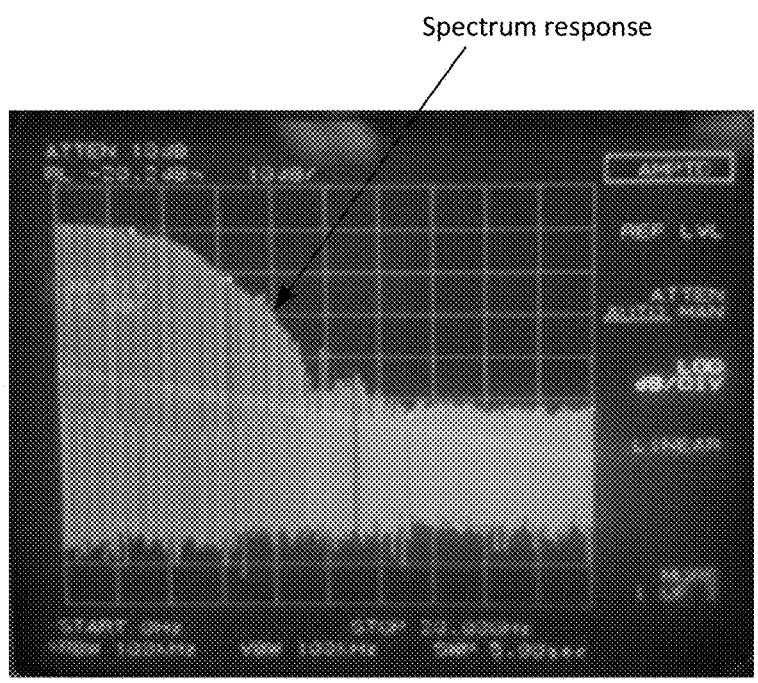

FIGS. 2A and 2B are images of example screen captures of an eye diagram and its spectrum of an example of an optimum electrical signal at an output of the TIA front-end 103 as shown in FIG. 1. Here in the present disclosure, the term "an optimum electrical signal" means an electrical signal without dispersion effects on the optical fiber at the output of the TIA front-end 103. In the example, the optimum electrical signal may be a signal of 9.830 Gb/s, i.e., Common Public Radio Interface (CPRI) line bit rate option 7, which has an eye diagram showing a wide opening as shown in FIG. 2A and its corresponding spectrum response as shown in FIG. 2B. In the example, for CPRI line bit rate option 7, a pseudo-random binary sequence (PRBS) 7 may be used. In an aspect, the signal of PRBS 7 may be generated by a polynomial $X^7+X^6+1$. Here, PRBS7 is selected as a test signal because it is a bit sequence similar to 8B10B coded data and because 8B10B encoding is often used in many optical systems as a means of overcoming many issues when high rate data is transmitted over an optical fiber over long distances.

In accordance with various aspects of the present technology disclosed herein, an electrical signal, similar to the optimum electrical signal having characteristics shown in FIGS. 2A and 2B, may be obtained through compensating dispersion effects on an optical fiber over a distance by a compensation device, e.g., the EDC device 105, in a dispersive optical fiber. In a typical environment, when an optical signal passes through the dispersive optical fiber, the optical signal may go through various forms of distortion as the optical signal propagates through a long optical fiber over distances. Especially, this becomes very significant when a wavelength is in a long wavelength range and a bit rate of data is high, i.e., 10 Gb/s, and the optical fiber length is long, often resulting in degradation of the performance of an optical system and limiting the transmission distance in networks. Further, when a spectral width of a light source or laser is wide or big and the chirp parameter is big, the signal distortion becomes greater, e.g., when DML type lasers are used. Using the present technology disclosed herein, however, these effects may be effectively mitigated or reduced.

In the description herein, for illustrative purposes, the following are used: a data rate of 10 Gb/s, a wavelength of a light source set to 1611 nm, use of a directly modulated distributed feedback (DFB) laser as the light source and a minimum optical fiber length of 20 km. It is noted that in the present disclosure, these parameters are selected for illustrative purposes only, and other parameter values may be used for implementing various aspects of the present technology. One of the reasons for using the above parameters for the illustrative purposes is that a distance of 20 km is a typical transmission distance of wireless front-haul networks, a wavelength of 1611 nm is a longest wavelength being used in an optical transmission in which a single mode fiber has the highest dispersion effect. Further, DML type lasers are used since the cost of DML type lasers is lower than that of EML type lasers and the dispersion effects may be seen more predominantly with DML type lasers over longer distances. As such, the DML type lasers are more often used to implement optical transceivers of low power consumption. On the other hand, EML type lasers are dominantly used for 10 Gb/s transmission applications in a long wavelength from 1471 nm to 1611 nm to implement many Coarse Wavelength Division Multiplexing (CWDM) networks.

Figure 3:
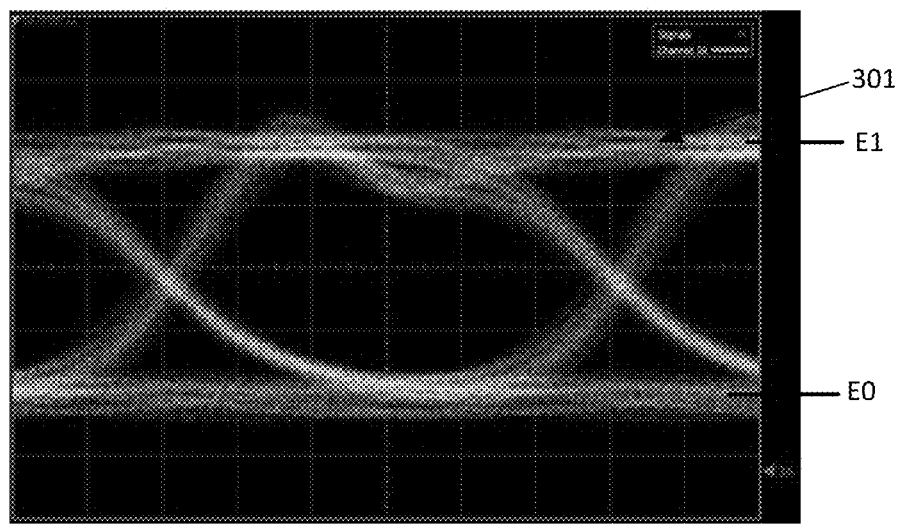
FIG. 3 is an example screen capture image of an optical eye diagram of 1611 nm DML modulated with a data pattern, e.g., PRBS7, at 10 Gb/s in accordance with an aspect of the present disclosure.

By way of example, FIG. 3 shows an optical eye diagram 301 when a data pattern, e.g., PRBS7, of 10 Gb/s which is modulated using a1611 nm DML is received at a receiver end of an optical transceiver.

Here, the term "an optical eye" means an eye diagram, which is an oscilloscope display on a measurement instrument in which a digital signal from a receiver is repetitively sampled instantaneously and applied to the vertical input, while the data rate is used to trigger the horizontal sweep. The measurement instrument measures samples of an input signal to form an eye diagram that can be used for analysis of the signal characteristics, such as noise, jitter, and eye mask requirement in accordance with multi-source agreements. The eye diagram is a sum of samples from superimposing the 1's, 0's and corresponding transition measurements, which results in an image that reveals the eye of the eye diagram on the display of the measurement instrument. The quality of signal or bit error rate (BER) degrades with eye closure and improves with eye opening.

The term "extinction ratio" as used herein means a ratio of the energy (or power) used to transmit a logic level "1" to the energy used to transmit a logic level "0" in optical communications. Extinction ratio may be used to describe the performance of an optical transmitter used and can be determined from the eye diagram, defined as a linear ratio, a percentage or in decibels (e.g., Extinction Ratio="1" power level/"0" power level). For example, if the "1" power level was 800 microwatts, and "0" power level was 40 microwatts, the extinction ratio would be 20. A difference between the two power levels describes a modulation power of a transmitted signal, and as such, the larger the modulation power, the easier it will be for a receiver to accurately determine what signal level is present. In the example, shown in an image of the example screen capture of an optical eye diagram of FIG. 3, an extinction ratio of the optical eye is measured as 5.8 dB (=10 (log (E1/E0)), where E1 is the mean power level for "1", and E0 is the mean power level for "0").

Figure 4A:
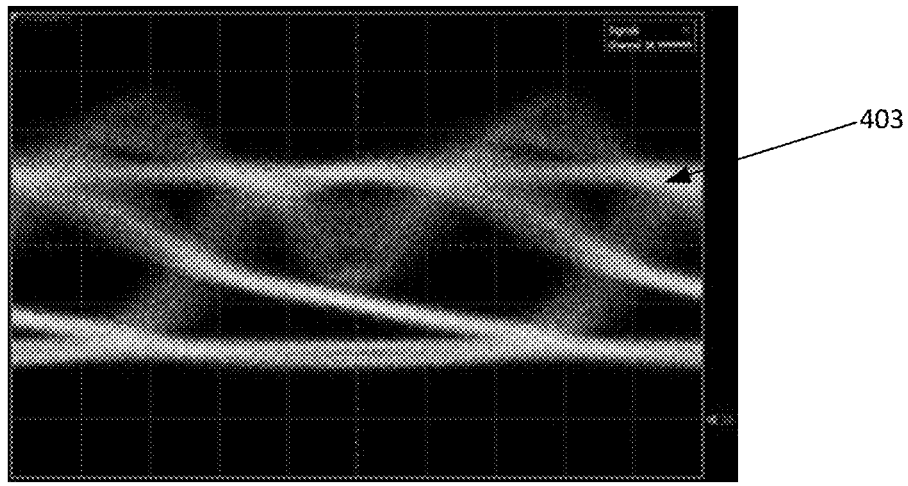
FIGS. 4A and 4B are example screen capture images of eye diagrams of the optical signal received using a wideband optical receiver after transmission over varying distances, e.g., 20 Km and 40 Km, in accordance with an aspect of the present disclosure.
Figure 4B:
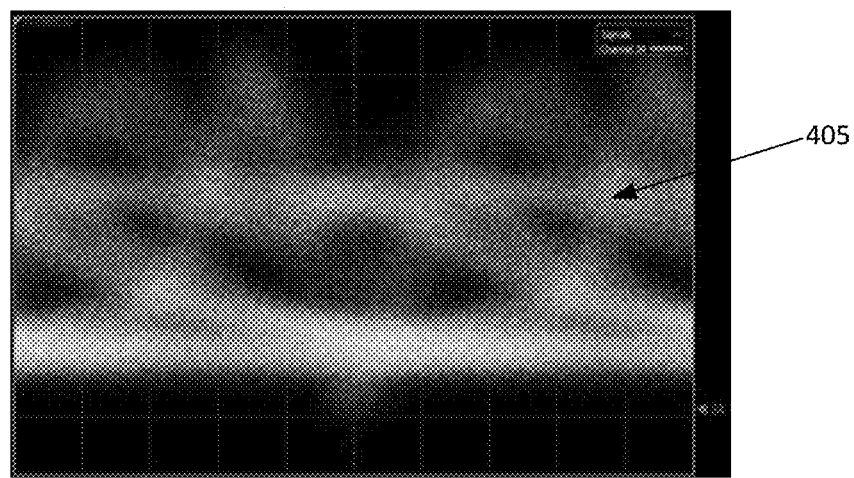

FIGS. 4A and 4B are images of example screen captures of eye diagrams of the signal received using a wideband optical receiver after optical transmission over varying distances, e.g., 20 Km and 40 Km, respectively. The wideband optical receiver used herein is an optical receiver with a bandwidth of 20 GHz. FIG. 4A illustrates an eye diagram 403 after optical transmission over a distance of 20 km and FIG. 4B illustrates an eye diagram 405 after optical transmission over a distance of 40 Km. As shown in the eye diagrams of FIGS. 4A and 4B, it can be observed that with a longer distance, the distortion or eye closure shown in the eyes diagrams becomes severe due to an inter symbol interference (ISI) caused by dispersion effects of a single mode fiber together with a broad spectrum of a modulated DML which has a relatively high chirp parameter. That is, as in FIG. 4B, as the distance becomes longer, e.g., 40 Km, the eye diagram for the case of 40 Km shows a worsened eye opening or more eye closure (e.g., more distortions and thus a higher likelihood of making errors in determining bit levels) than the eye diagram for the case of 20 Km, and as a result at the receiver of an optical transceiver on the other end of the optical transmission, it becomes very difficult to understand or determine bit levels in the eye diagram for the distance of 40 Km and thus more errors will likely result, thereby degrading the performance of the receiving system. This worsened eye closure over the longer distance thus limits the optical transmission distance for the case.

Figure 4C:
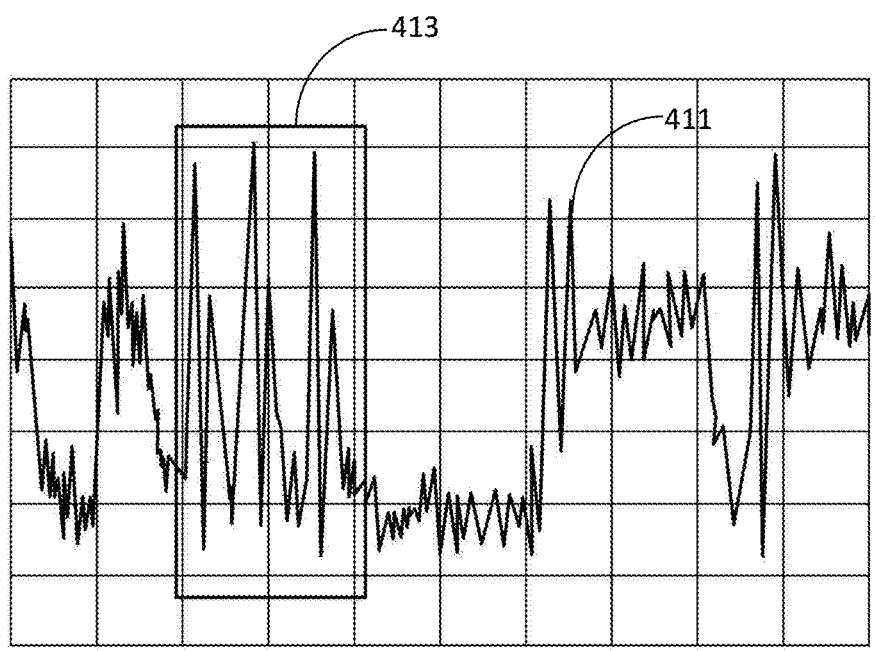
FIG. 4C is a graphical representation of a data pattern after transmission over the distance of 40 Km in accordance with an aspect of the present disclosure.

Further, FIG. 4C is a graphical representation illustrating a data pattern 411 after transmission over the distance of 40 Km. Further, the data in a rectangular box 413, which corresponds to the eye diagram of FIG. 4B, is "10101". As noted above, in FIG. 4B, it is difficult to determine exactly bit levels in the eye diagram, because the eye opening is very distorted and disappearing due to signal distortion caused by the dispersion on the optical fiber.

Referring back to FIGS. 4A and 4B, to clearly understand what happens to the data after the transmission over distances, a careful observation of the data pattern is needed. By way of example, FIG. 4C shows a portion of a PRBS7 data pattern 411. After transmission of the PRBS7 data pattern over a distance of 40 Km, it is observed that "1" bit is split into half a bit. For example, in a case of 10 Gb/s data, the frequency of a NRZ data, "10101 . . . " corresponds to 5 GHz. Thus, in the 10101 . . . NRZ data, "1" bit is split and becomes "101" bits having a 2 times faster data rate. This means that 10 GHz frequency components may be generated after the optical transmission of the data signal over the distance. Another observation that may be made is that at every rising edge of consecutive "1" bit, the first bit is shown to have the same splitting. This observed "bit splitting" is undesirable and may be explained by physics of DFB lasers. That is, this may be related to an inherent resonance frequency of each laser, and at a rising edge, the rate of wavelength change may be dominant, which may be called as a transient chirp. The term "chirp" as used herein means an instantaneous frequency rise or decrease (or a wavelength change) with time. The wavelength components generated by this wavelength change at the rising edges may have different arrival times at an optical receiver after propagation through the optical fiber. As such, a single mode optical fiber is a dispersive medium. As noted above, these split bits are undesirable signal components (e.g., high frequency components).

In the example, the above mentioned split bits result in high frequency component (10 GHz) and loss in energy of the original bit (5 GHz). As such, the high frequency components (10 GHz) may be removed by using passive electronic components in accordance with an aspect of the present disclosure. So, once the high frequency component, i.e., 10 GHz, caused by the split bits is removed, the amplitude of the original "1" bits may lose its energy. As a result, its amplitude of the original "1" bits may be reduced. This phenomenon can be easily observed when the frequency component caused by the split waveform is similar to the bit rate of the NRZ data.

Figure 5A:
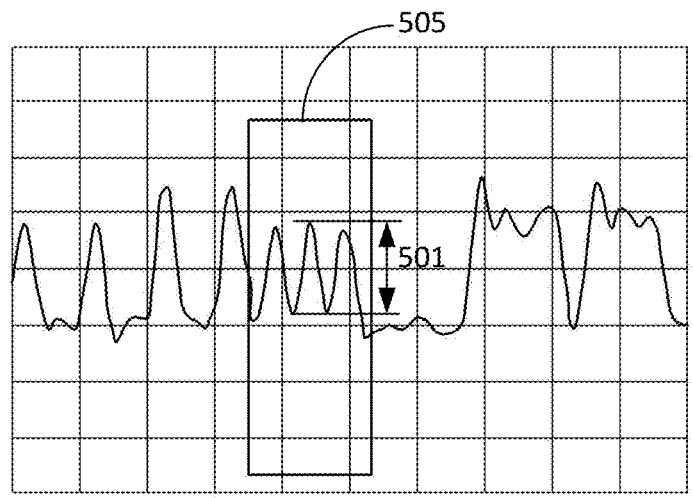
FIGS. 5A and 5B are an example graphical representation of a data pattern (i.e., PRBS7) and an example screen capture image of the eye diagram of the data pattern in FIG. 5A in accordance with an aspect of the present disclosure.
Figure 5B:
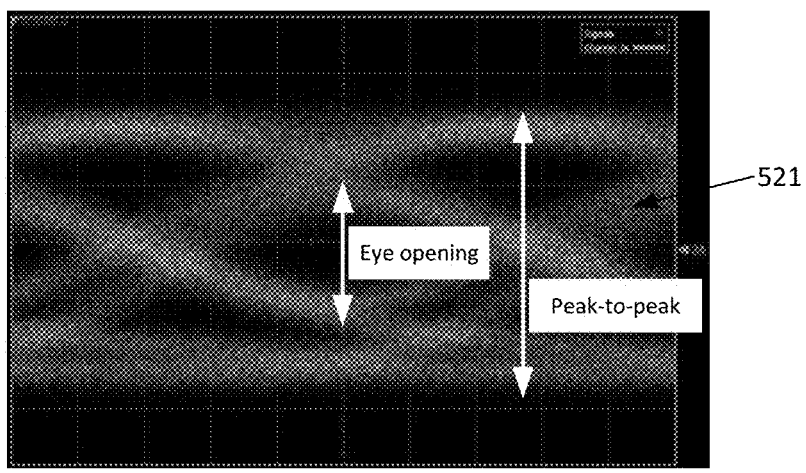

By way of example, FIGS. 5A and 5B show respectively an example of a data pattern (i.e., PRBS7) and its eye diagram after the removal of the high frequency components by an EDC device in the electrical signal produced by a TIA front-end of an optical receiver. For example, a first filter, e.g., a notch filter including a plurality of resistors, a plurality of inductors, and/or a plurality of capacitors, of the EDC device may be used to remove the high frequency components in the received electrical signal. As shown in FIG. 5A, the amplitude 501 of "10101" bits in a rectangular box 505 is reduced, e.g., compared to other bits. That is, the amplitude of "10101" bits in the rectangular box 505 is relatively small compared to other bits having longer identical bits, "11 . . . " or "00 . . . ", e.g., bits outside the rectangular box 505. FIG. 5B shows a corresponding eye diagram of the electrical signal after removing the high frequency components in the signal shown in FIG. 4C. However, the corresponding eye diagram 521 shown in FIG. 5B is not fully open at a center of the eye, and there is still room for opening up the eye to obtain better receiver performance. In other words, the eye diagram of FIG. 5B usually results in a bad optical sensitivity and thus results sometimes in error floors in bit error rate (BER) measurements. Another aspect that can be observed from FIG. 5A is that the most significantly affected bits by the optical fiber dispersion among all possible random data bits is a single "1" bit.

In an aspect of the present disclosure, after removing the high frequency components in the received electrical signal by using the first filter, the amplitude of "1" bit may be restored close to the original amplitude using a second filter of the EDC device. The second filter may include a plurality of resistors, a plurality of inductors, and/or a plurality of capacitors, in accordance with various aspects of the present disclosure.

It is noted that as seen in the example screen capture of the eye diagram of FIG. 5B, the eye closure is due to a reduction of the amplitude of "1" bit. This means that, if the amplitude of "1" bit is increased to a peak-to-peak amplitude of the eye, then the eye shown in FIG. 5B may be opened at the center of the eye to increase the receiver performance of the optical receiver, e.g., BER performance. Also, it is noted that the peak-to-peak amplitude of the eye corresponds to low frequency components in a spectrum of 10 Gb/s data. Thus, in the example, the amplitude at 5 GHz may be simply increased by implementing a filter with a specific gain characteristic, e.g., to have more gain at a low frequency of interest, e.g., 5 GHz, compared to other low frequencies close to 0 Hz, which may be similar to designing a high pass filter. It is noted that the gain at 0 Hz is not necessarily zero. Thus, in FIG. 5B, the center of the eye diagram 521 is around 50% closed compared to the peak-to-peak value of the eye, the filter may be designed such that the filter has 6 dB more gain than the low frequency and added to a notch filter which may be implemented to remove the high frequency components of 10 GHz from the received electrical signal, as shown in FIG. 5A. As such, the EDC device including the first filter and the second filter, in accordance with an aspect of the present disclosure, may be effectively used to compensate the dispersion effects over an optical fiber over a distance, resulting in significant savings in power consumption and costs in the design of an optical transceiver with significantly improved BER performance.

Figure 6:
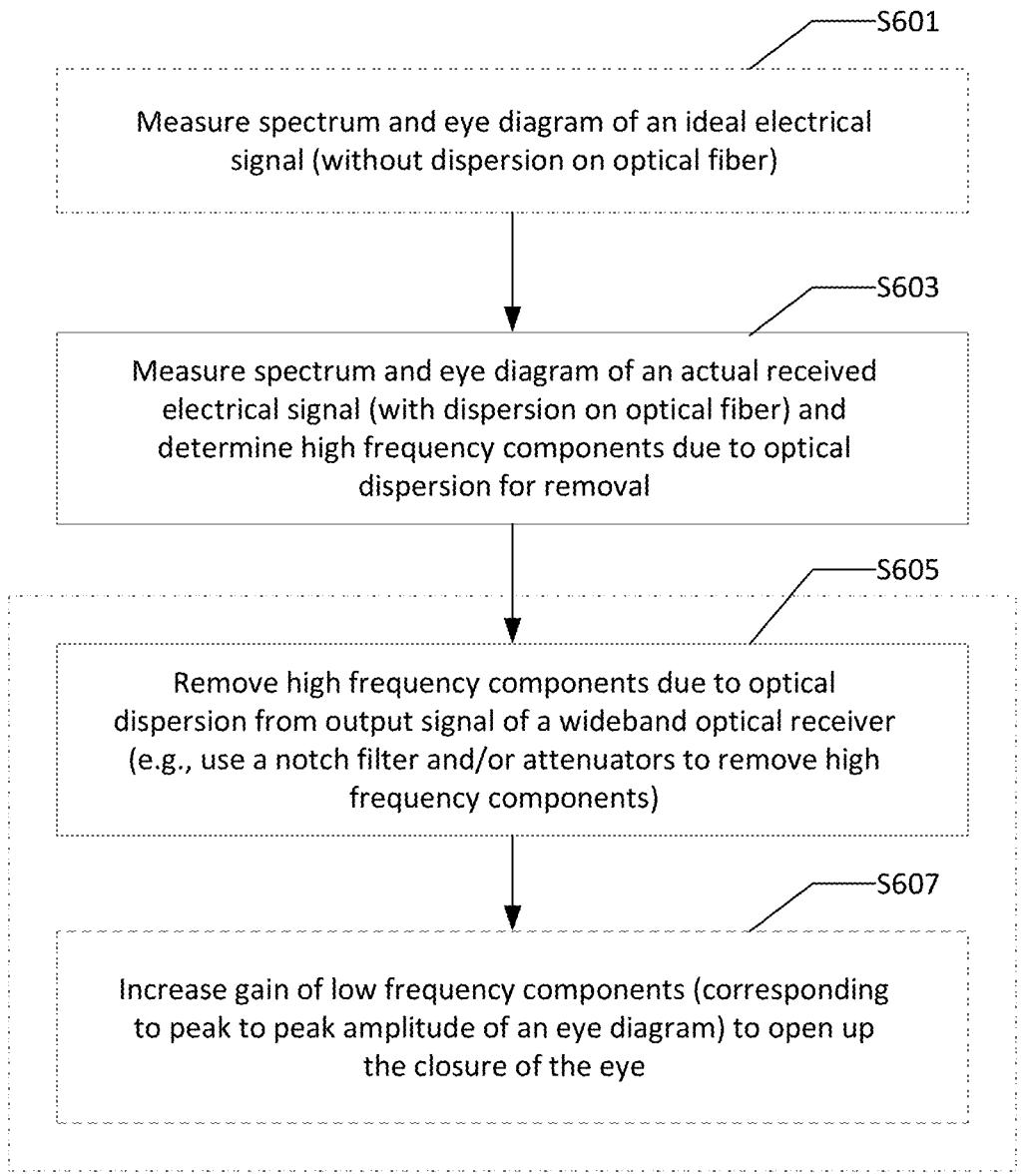
FIG. 6 is a flow chart for conceptually illustrating the implementation of an EDC device in accordance with an aspect of the present disclosure.

In an aspect of the present disclosure, a summary of a design and implementation of an EDC device in a time domain may be provided as a flow chart as shown in FIG. 6. FIG. 6 illustrates a flow chart for conceptually illustrating the design and implementation of the EDC device in an aspect of the present disclosure. At S601, a spectrum (or a frequency response) and eye diagram of an ideal electrical signal, e.g., data signal, are measured without optical dispersion. The spectrum (or frequency response) and/or eye diagram of the ideal electrical signal may be measured by using a high-speed measurement device with an oscilloscope display capability. Further, the characteristics of the measured spectrum and/or eye diagram may be stored in one or more memories of an optical transceiver in an aspect of the present technology. That is, the characteristics or values of the measured spectrum and/or eye diagram may be stored in the one or more memories as a reference template for later use, e.g., for comparing with those of an actual received signal and determining a target response that is to be realized by an EDC device. Further, the characteristics or values of the measured spectrum and/or eye diagram of the ideal electrical signal may be obtained in a controlled laboratory environment so that there is no dispersion on a data signal that is transmitted over an optical fiber. Alternatively, step S601 may be optionally performed. Also, the spectrum and/or eye diagram of the ideal electrical signal may be estimated by performing theoretical analysis in one or more processing systems.

At S603, a spectrum (or a frequency response) and/or eye diagram of an actual received electrical signal with optical dispersion on the optical fiber over a distance are measured and high frequency components due to optical dispersion in the measured spectrum are determined for removal by the EDC device. The measurement of the spectrum and/or eye diagram of the actual received electrical signal with optical dispersion on the optical fiber over the distance may be obtained manually in the controlled laboratory environment. On the high-speed measurement device, the data signal, the spectrum and/or the eye diagram may be displayed in an oscilloscope display of the high-speed measurement device. By visually inspecting or using an automatic programming unit, either on board an optical transceiver or coupled to the optical transceiver, unwanted frequency components, such as high frequency components occurring due to optical dispersion may be determined or identified in the measured spectrum and/or eye diagram of the actual received electrical signal which is affected by the optical dispersion over the distance. In the example, as discussed above, bit-splitting (or split waveform) may be identified as the unwanted high frequency components. Further, in another implementation, the measurement of the spectrum and/or eye diagram of the actual received electrical signal with optical dispersion may be done by one or more processing systems of an optical receiver.

At S605, the unwanted high frequency components due to optical dispersion, e.g., 10 GHz in the example discussed above, are removed from the actual received electrical signal, e.g., an output signal of a wideband optical receiver, by means of an EDC device. Here, in accordance with aspects of the present disclosure, various methodologies or techniques may be employed to remove the unwanted high frequency components. In one implementation, a specific arrangement of passive electronic components may be used. By way of example, the EDC device using RLC passive components, e.g., a notch filter and/or attenuator circuit, may be implemented to remove the unwanted high frequency components of interest in the actual received electrical signal.

At S607, a desired gain frequency response of the electrical signal using the passive electronic components such as resistors, inductors, and/or capacitors may be optically shaped or obtained, such that the measured spectrum and/or eye diagram of the actual received signal becomes like the measured spectrum and/or eye diagram of the ideal electrical signal at S601. By way of example, in the example discussed above, a gain filter using RLC passive components may be designed and implemented to add more gain at a desired specific frequency of interest, e.g., 5 GHz in the example, than other low frequencies close to 0 Hz to open up the closure of the eye diagram, e.g., to increase bit energy as described herein. Also, it is noted that steps S605 and S607 may be performed by a single filter or a composite filter of the EDC device having a desired overall gain frequency response. Some of the example implementations are illustrated in FIGS. 12-14.

Figure 7:
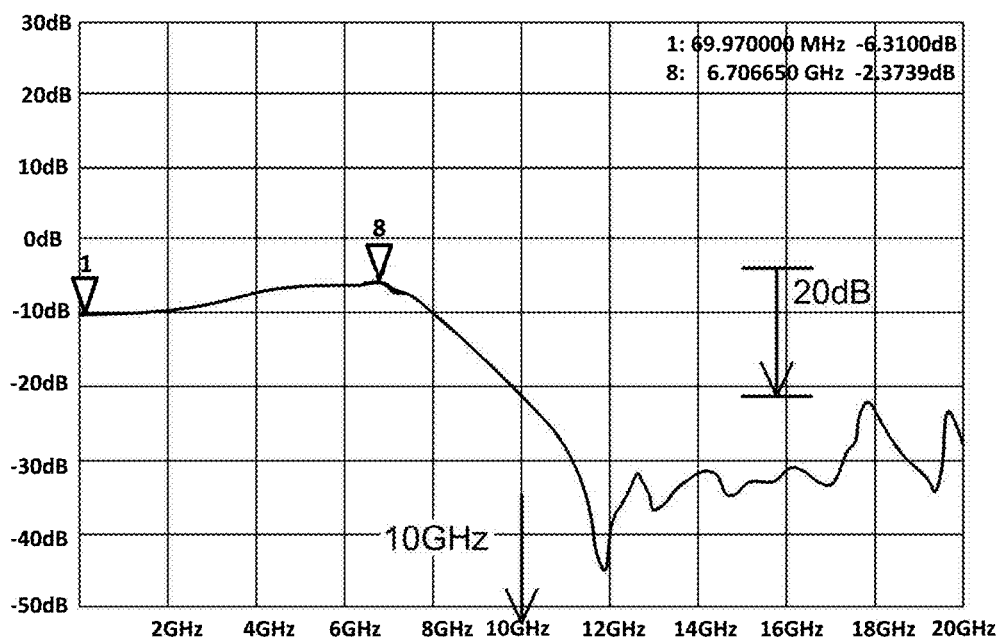
FIG. 7 is an graphical representation of a frequency gain response of an EDC device which is implemented using the RLC passive components in accordance with an aspect of the present disclosure.

FIG. 7 is a graphical representation of an example of a gain frequency response of the EDC device or a composite filter (or an EDC filter) which is implemented using the RLC passive components and is configured to compensate the dispersion or dispersion effects on the optical fiber over the distance. In FIG. 7, a center frequency of a notch filter may be located around 12 GHz to reduce effects of impedance of the notch filter to the spectra of data and to adjust a slope of a roll-off of a frequency of the notch filter at above 8 GHz. That is, by locating the center frequency of the notch filter at 12 GHz, as shown in FIG. 7, the frequency response up to 8 GHz is well maintained and the frequency response starts to roll-off to reduce 10 GHz high frequency components. As such, the attenuation at 10 GHz compared to a peak value of the filter response is about 20 dB which is good for many applications.

The EDC filters or microwave filters will have main functions such as to reject undesirable signals outside a filter passband and to separate or combine signals according to their frequency. By way of example, a low-pass filter may be designed to pass the low frequency signals below a first predetermined value. A high-pass filter may be designed to pass the high frequency signals above a second predetermined value. A band-pass filter may be designed to pass signals between two predetermined frequencies, and a notch filter (also known as a bandstop or band reject filter) may be designed to reject signals between two predetermined frequencies. As such, the passive electronic components of the EDC device, such as resistors, inductors, and/or capacitors may be arranged in a particular manner to design and/or implement one or more of the above filters with desired frequency (or gain frequency) characteristics.

Figure 8A:
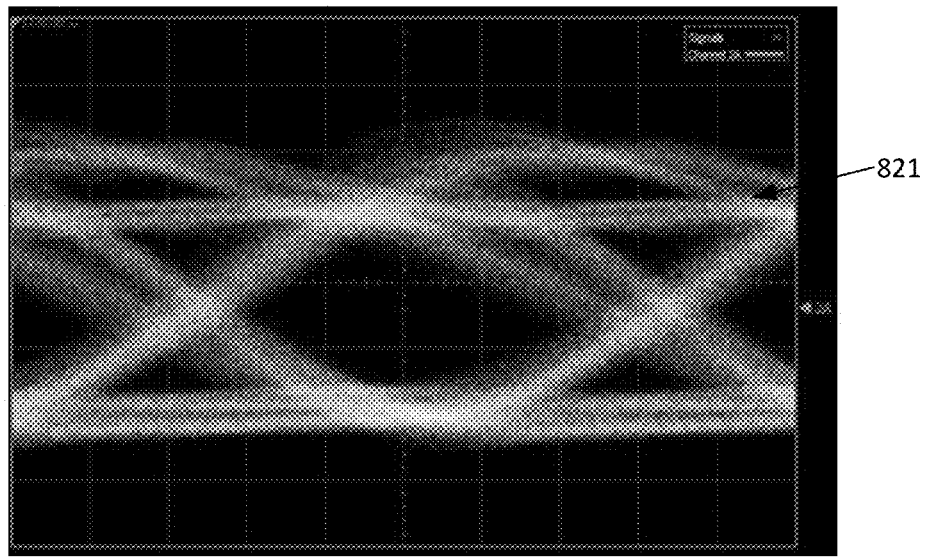
FIGS. 8A and 8B are example screen capture images of eye diagrams after compensation by the EDC device in accordance with an aspect of the present disclosure.
Figure 8B:
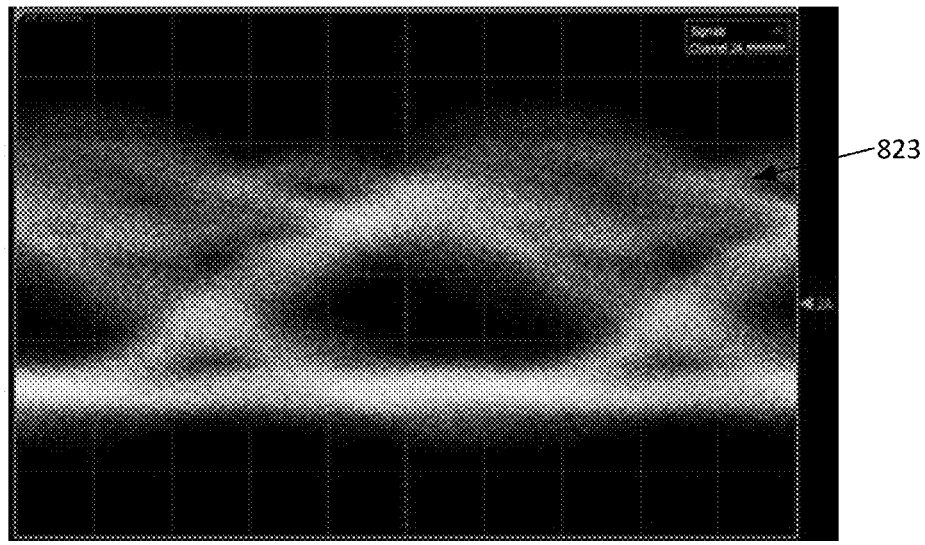

Having designed and implemented the EDC device having a particular gain frequency response characteristic as shown in FIG. 7, let's examine eye diagrams of electrical signals after optical transmission over distances of 20 Km and 40 Km. FIGS. 8A and 8B show eye diagrams captured after the EDC device respectively. By way of example, FIG. 8A shows an eye diagram 821 for a case of optical transmission over a distance of 20 Km, which has a wider opening of the eye compared to the un-compensated eye diagram 403 (or without use of the EDC device in the optical receiver) shown in FIG. 4A. FIG. 8B shows an eye diagram 823 for a case of optical transmission over a distance of 40 km, which has a much wider opening of the eye compared to the un-compensated eye diagram 405 (or without use of the EDC device in the optical receiver) shown in FIG. 4B. Here, it is noted that optical eyes are measured with a wideband linear receiver with a bandwidth of greater than 20 GHz with the EDC device in accordance with an aspect of the present disclosure. Both of the eye diagrams 821 and 823 show that the EDC device in accordance with an aspect of the present disclosure effectively reduce or mitigate the effects of optical dispersion over optical fiber over distances on the received electrical signal, thereby greatly improving the BER performance of the optical receiver.

In an aspect of the present disclosure, as noted above, the EDC device may be designed and implemented in the form of a single filter or a composite filter using passive electronic components or devices, such as a plurality of resistors, a plurality of inductors, and/or a plurality of capacitors. The EDC device may work well with a TIA front-end, and an extra filter may also be designed and added to compensate the frequency response of the TIA front-end. In another aspect of the present disclosure, the low pass characteristics of the TIA front-end may be utilized and leveraged. Still in another aspect of the present disclosure, an additional compensation filter may be implemented to shape an overall frequency response to obtain the best results as possible, e.g., that is, to obtain a frequency response that is as close as to that of an ideal signal without optical dispersion effects.

Figure 9:
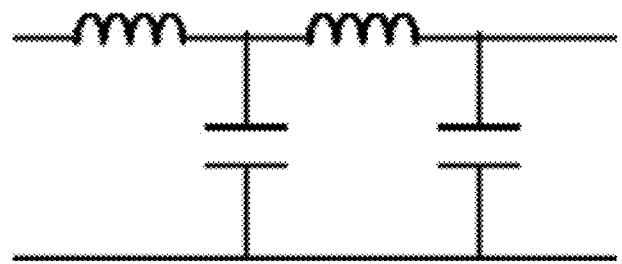
FIG. 9 is an example diagram of a low pass filter that may be implemented using passive electronic components in accordance with an aspect of the present disclosure.

In one implementation, the EDC device may be realized by combining a low pass filter with a low Q notch filter. Alternatively, in another implementation, the EDC device may be implemented as a combination of a low pass filter, a notch filter, and an attenuator. The low-pass (or high-pass) filter, the notch filter, and the attenuator circuits are building blocks for designing and implementing the EDC device in accordance with an aspect of the present disclosure. FIG. 9 is an example diagram of a low pass filter that may be used in the design of an EDC device. The order of the low pass filter shown in FIG. 9 is an example of a $4^{th}$ order, but other order of the low pass filter may be chosen as necessary. Also, a type of the low pass filter may be determined by LC values selected.

Figure 10A:
FIGS. 10A and 10B are example diagrams of a notch filter that may be implemented using passive electronic components in accordance with an aspect of the present disclosure.
Figure 10B:
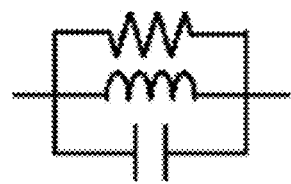

Further, a typical notch filter may be implemented as either a serial LC resonator as shown in FIG. 10A or a parallel LC resonator as shown in FIG. 10B. Further, by adding a resistor, the Q of the notch filter may be adjusted, enabling design of a required filter response with relative ease.

Figure 11A:
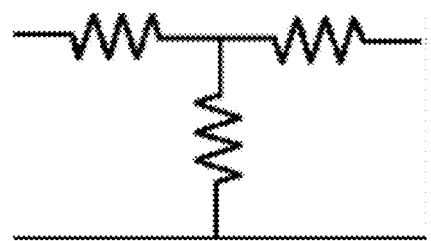
FIGS. 11A and 11B are example diagrams of fixed attenuators that may be implemented using passive electronic components in accordance with an aspect of the present disclosure.
Figure 11B:
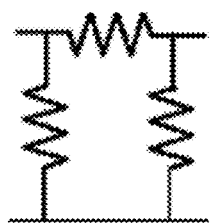

Furthermore, FIGS. 11A and 11B show examples of fixed attenuators that may be implemented. An example implementation of a typical T-attenuator is shown in FIG. 11A, and an example implementation of a PI-attenuator is shown in FIG. 11B. A bridged T-attenuator or other type may also be used. In the present disclosure, the term "attenuator" as used herein means a passive microwave component which reduces the signal by a specified amount when inserted in a signal path of a system. Also, the attenuators may be fixed or variable attenuators. The fixed attenuators may by characterized by factors including input and output impedance, flatness with frequency, average and peak power handling capability and temperature dependence. The variable attenuators may include step attenuators and continuously variable attenuators. In a step attenuator, the attenuation may be changed in steps such as 0.5 dB, 1 dB, or 10 dB. In a continuously variable attenuator the attenuation may be changed continuously.

An attenuator may be used to obtain a higher gain at a high frequency compared to that at a low frequency. In an aspect of the present disclosure, a-fixed gain attenuator as shown above may be chosen based on how much gain at the high frequency is needed. For example, if 6 dB more gain at 5 GHz than that at the low frequency is needed, then greater than 6 dB fixed attenuator which is either T-type, Pi-type or the like may be used in the design of an EDC device. Further, by adding one or more capacitors or inductors, the gain may be compensated to have 6 dB more gain than the low frequency. In an aspect of the present disclosure, a variable attenuator may be used to vary attenuation for varying frequencies of interest in an automatic setting.

Figure 12A:
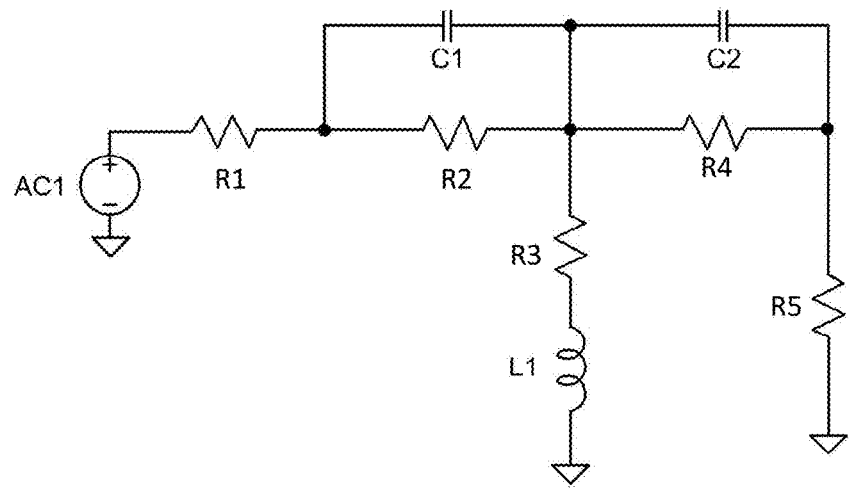
FIG. 12A and FIG. 12B are an example of an EDC device using RLC passive components and example phase, gain frequency responses in accordance with an aspect of the present disclosure.
Figure 12B:
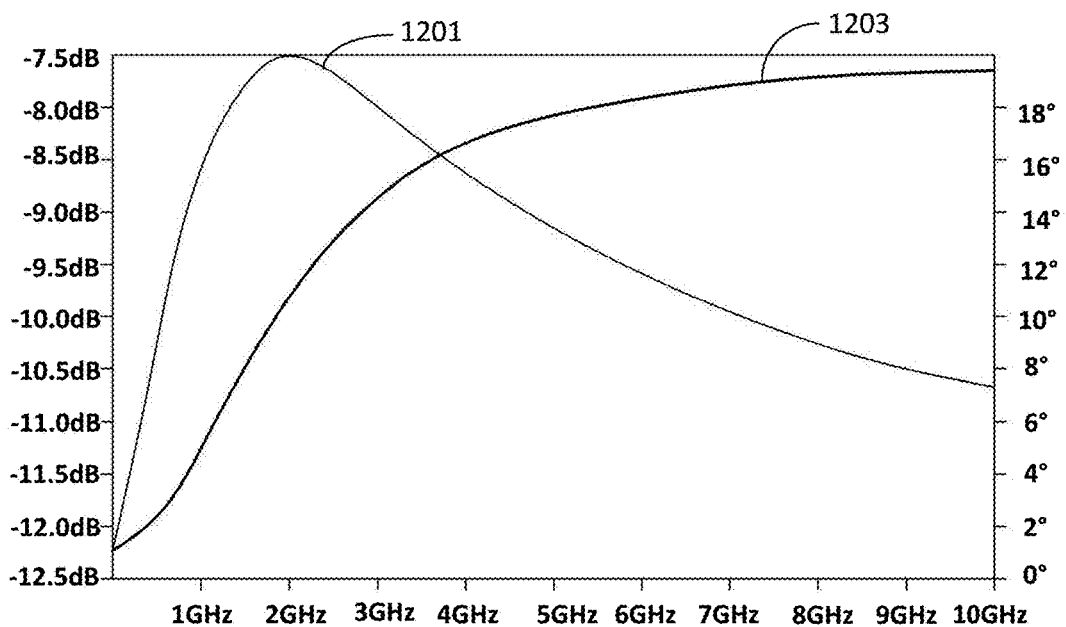

Having briefly discussed basic building blocks for designing and/or implementing an EDC device for compensating the dispersion of the optical fiber, examples of implementations of the EDC device are illustrated in FIGS. 12A and 12B, in accordance with various aspects of the present disclosure.

By way of example, FIG. 12A and FIG. 12B illustrate an example of an EDC device in the form of a filter using RLC passive components using a T-type attenuator circuit, e.g., FIG. 12A, and its respective frequency response, e.g., FIG. 12B. As noted above, in FIG. 12A, the EDC device is implemented as a high-pass type filter, providing high gain at high frequencies than the low frequency type filter, using a T-type attenuator.

In the example, the T-type attenuator shown in FIG. 12A is a 6 dB attenuator and L1, C1, and C2 are used to compensate to obtain a desired gain frequency response, which is shown in FIG. 12B. The example shown in FIG. 12B illustrate a phase-frequency response 1201 and a gain-frequency response 1203 of the circuit shown in FIG. 12A. The gain frequency response 1203 shows that the gain at 5 GHz is about 4-5 dB higher than other low frequencies. In the example and in an aspect of the present disclosure, as shown in FIG. 12A, by selecting suitable values of the resistance R1, R2, R3, and R4, inductance L1, capacitance C1 and C2, the gain at the high frequency may be increased without sacrificing the impedance. By way of example, the following values of the passive components may be used, R1=50 ohm, R5=50 ohm, R3=68 ohm, R2=18 ohm, R4=18 ohm, C1=5 pF, C2=0, and L1=5.8 nH. Also, note that when choosing the values of C1, C2 and L1, the values may be selected within a necessary impedance mismatch boundary.

In another aspect of the present disclosure, the EDC device shown in FIG. 12A may be fine-tuned or modified slightly, when a different gain frequency response is desired. By way of example, for fine tuning of the EDC device, a 10 Gb/s APD receiver may be used in the example. That is, for a given avalanche photodiode (APD), the gain-bandwidth product value is constant, and using the gain-bandwidth product, by adjusting the gain of the APD (e.g., by changing a value of the voltage supplied to the APD), the bandwidth can be tuned to a wider bandwidth or a smaller bandwidth. In an aspect of the present disclosure, this bandwidth tuning may be used to fine tune an overall frequency response of the EDC device in addition to, or in combination of a frequency response of the EDC device based on the passive electronic components.

Figure 13A:
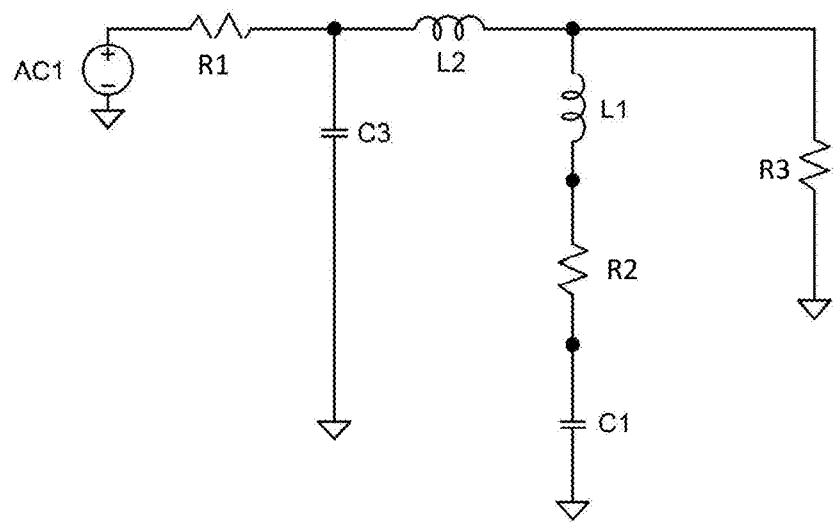
FIG. 13A and FIG. 13B are an example of an EDC device using RLC passive components and example phase, gain frequency responses in accordance with an aspect of the present disclosure.
Figure 13B:
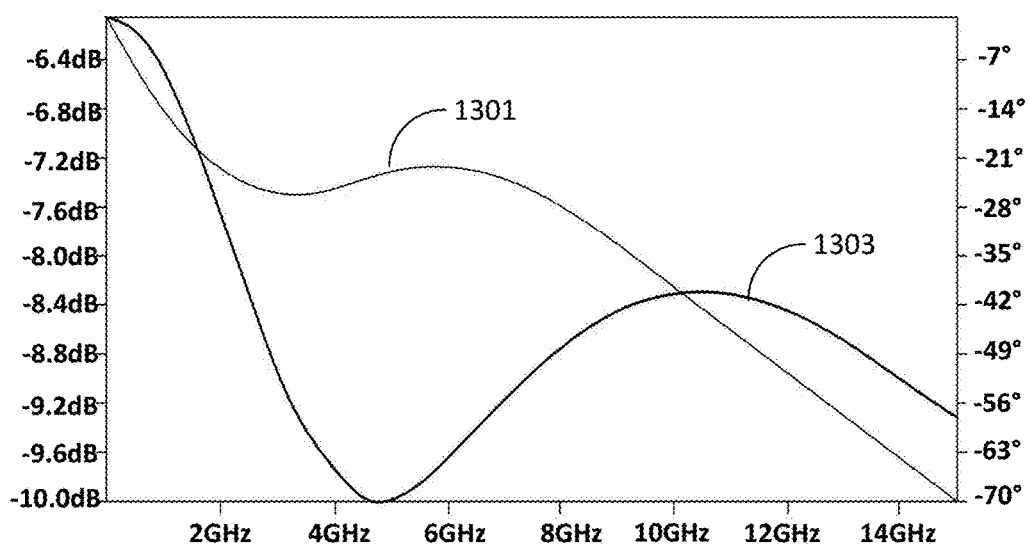

FIG. 13A and FIG. 13B illustrate another example implementation of the EDC device, in accordance with another aspect of the present disclosure. FIG. 13A shows an example implementation of the EDC device as a combination of a low-pass filter and a notch filter, e.g., a serial resonator. By way of example, in FIG. 13A, the low-pass filter includes a resistor with a resistance value R1 (e.g., 50Ω) and a capacitor with a capacitance value C3 (e.g., 0.3 pF). Further, in another implementation, the low-pass filter may have Bessel filter type values. Also, the notch filter may be in the form of a serial resonator, and the serial resonator includes an inductor with an inductance value L1, a resistor with a resistance value R2 and a capacitor with a capacitance value C1. The serial resonator may be controlled by the resistance value R2, which controls a depth of a notch response as shown in FIG. 13B, which shows a phase-frequency response 1301 and a gain-frequency response 1303. Note that in FIG. 13B, the notch response includes a depth of about −10 dB at 5 GHz. It is noted that this filter is similar to the one used for results shown in FIG. 17. In the example, the following values of the passive components may be used, R1=R3=50 ohm, R2=40 ohm, C1=1 pF, C3=0.3 pF, L1=1 nH, and L2=0.5 nH.

Figure 14A:
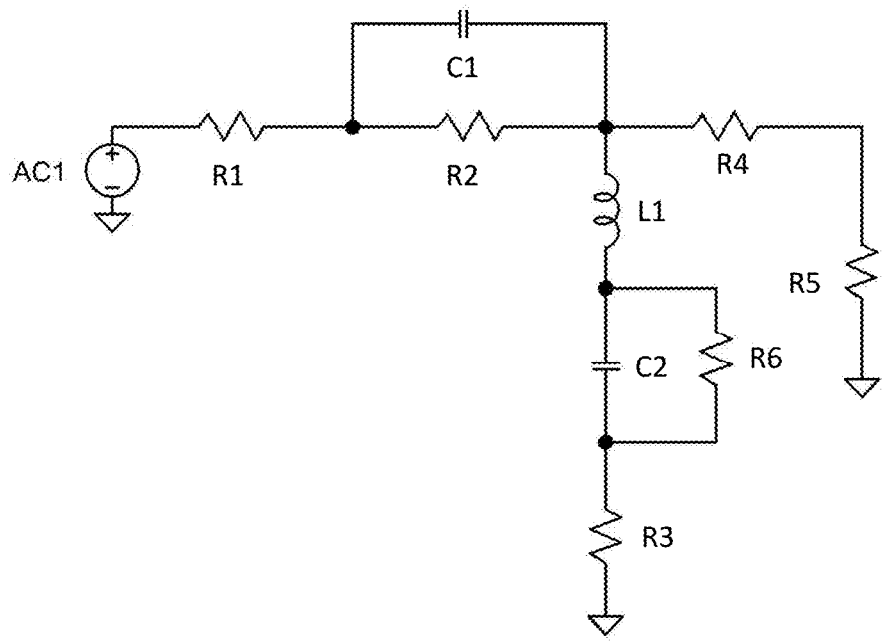
FIG. 14A and FIG. 14B are another example of an EDC device using RLC passive components and example phase, gain frequency responses in accordance with an aspect of the present disclosure.
Figure 14B:
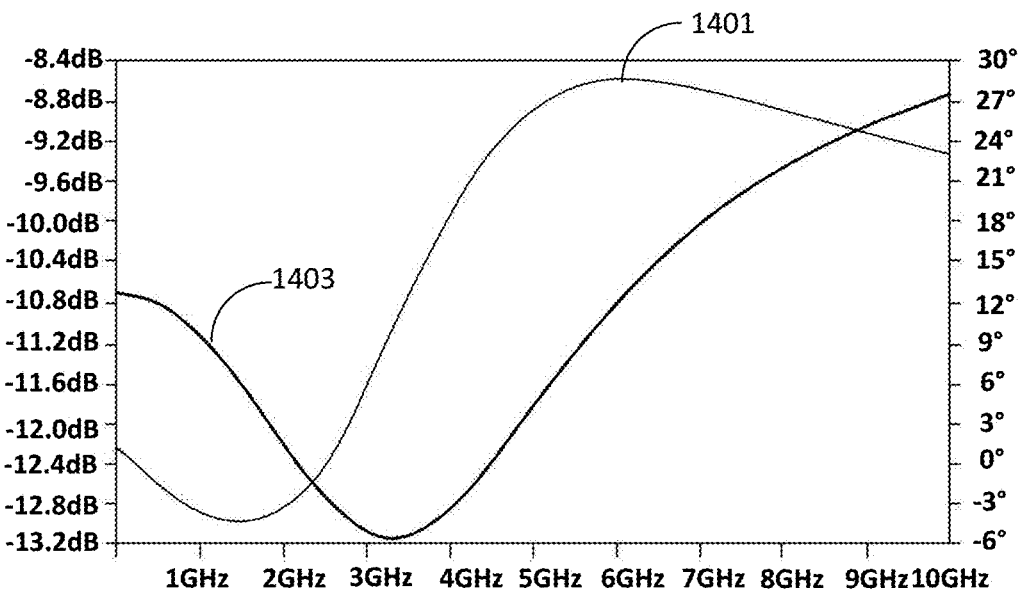

Further, FIG. 14A and FIG. 14B show another example implementation of an EDC device, in accordance with an aspect of the present disclosure. By way of example, the EDC device of FIG. 14A includes a combination of a modified T-attenuator and a serial resonator. The serial resonator may be a part of the modified T-attenuator. FIG. 14B shows a phase-frequency response 1401 and a gain-frequency response 1403 of the circuit shown in FIG. 14A. In FIG. 14B, a response of a notch at 3.5 GHz is illustrated and the gain increases as the frequency increases. In the example, the following values of the passive components may be used, e.g., R1=50 ohm, R3=30 ohm, R2=18 ohm, C1=3 pF, L1=1.5 nH, C2=1.5 pF, R4=18 ohm, R5=30 ohm, and R6=100 ohm.

Figure 15A:
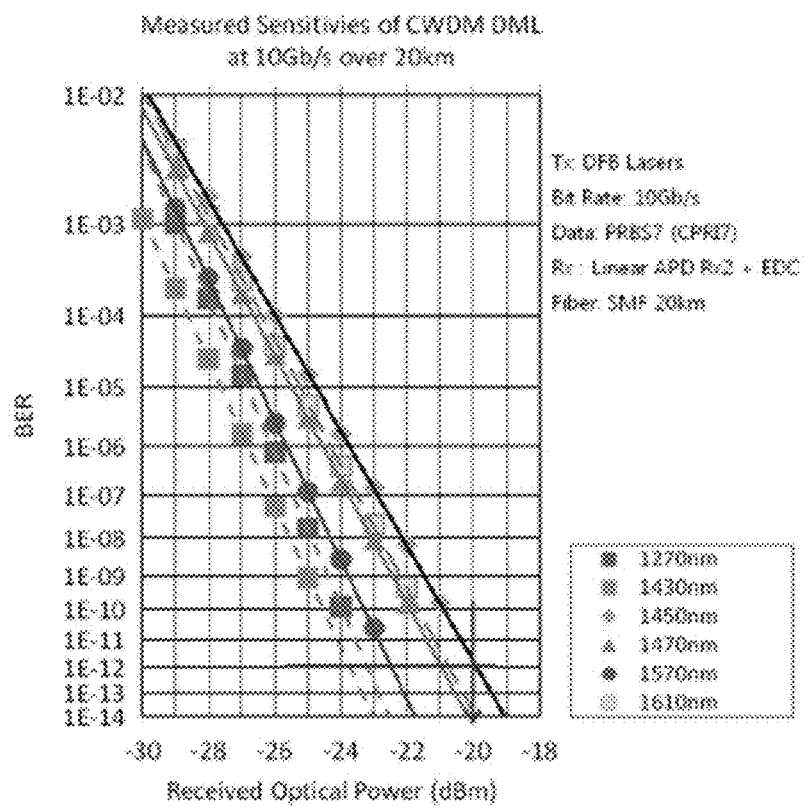
FIG. 15A and FIG. 15B show examples of BER performance results of CWDM DML lasers at 10 Gb/s over a distance of 20 km and an eye diagram when the EDC device is implemented in an optical receiver in accordance with an aspect of the present disclosure.
Figure 15B:
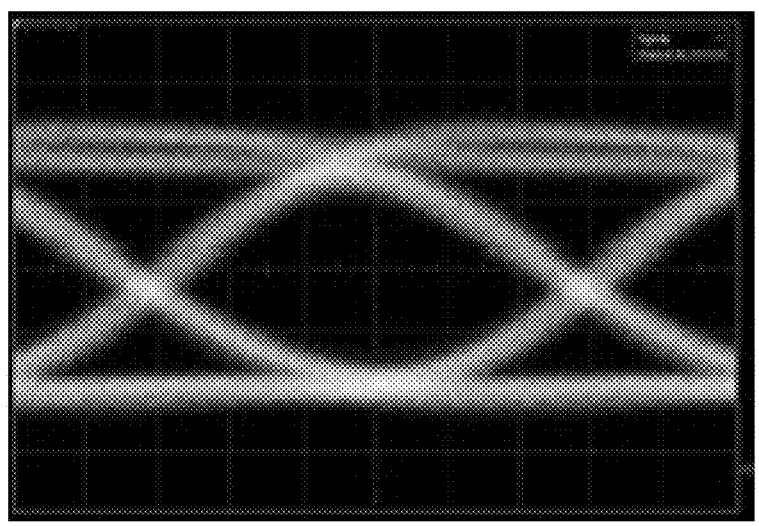

As described in the present disclosure, the EDC device may be implemented in various ways using passive electronic components such as resistors, inductors, and/or capacitors. Based on a desired frequency response (of an ideal signal without dispersion effects), the values of the passive components in the EDC device may be modified or selected. FIG. 15A and FIG. 15B show example BER performance results of CWDM DML lasers at 10 Gb/s over a distance of 20 km and an image of a screen capture of an eye diagram, when the EDC device is implemented in an optical receiver in accordance with various aspects of the present disclosure. As can be seen in FIG. 15A, the BER performance is very good over a varying power level of an optical receiver at different wavelengths. By way of example, the BER performance of CWDM DML lasers is measured at various wavelengths, e.g., 1270 nm, 1430 nm, 1450 nm, 1470 nm, 1570 nm, and 1610 nm, at a bit rate of 10 Gb/s. In the example, a data sequence of PRBS7 (for CPRI7) is used for a data signal. On a receiving end of an optical receiver, an EDC device in an aspect of the present disclosure is implemented using the passive electronic components.

As shown in FIG. 15A, at the various wavelengths, corresponding BER curves are all straight BER curves, which means that there is no error floor in the example optical receiver (or the optical system) including the EDC device in accordance with an aspect of the present disclosure. Note that the sensitivity is better than −20 dBm at a BER of 10E-12. Further, an equalized or compensated eye diagram with a wide eye opening at an output of the EDC device as shown in FIG. 15B, which shows, for example, an eye diagram at the optical receiver for 1610 nm DML transmitted signals over optical transmission over a distance of 20 Km.

As described herein, the present technology provides a very cost effective means to compensate dispersion on the optical fiber using an electronic dispersion compensation (EDC) device comprising passive electronic components such as a plurality of resistors, a plurality of inductors, and/or a plurality of capacitors. Based on an ideal frequency gain response over a frequency bandwidth of interest and an actual frequency gain response, one can adjust values of the passive electronic components of the EDC device to modify or shape the actual frequency gain response similar to the ideal frequency gain response over the frequency bandwidth of interest. By doing so, the BER performance of the optical receiver may be significantly improved, thereby increasing optical transmission distance.

Alternatively, the EDC device may be designed and implemented using a frequency domain approach. That is, in an aspect of the present disclosure, based on desired gain frequency response characteristics and an ideal gain frequency response characteristics, an EDC device may be designed using the passive electronic components in a frequency domain.

As noted above, referring back to FIGS. 2A and 2B, an ideal eye diagram of a data signal, e.g., 10 Gb/s NRZ data, without optical dispersion, and its spectrum in a frequency domain are shown in FIGS. 2A and 2B. In the description below, a frequency domain approach for designing an EDC device is provided for illustrative purposes. In summary, in the frequency domain approach, an overall envelope of the spectrum of an ideal signal over a frequency range of interest may be determined or measured, for example, the spectrum of the ideal data signal in FIG. 2B, and then, a first piecewise linear frequency response of a spectrum envelope may be derived or constructed. After constructing the first piecewise linear frequency response of the spectrum envelope of the spectrum of the ideal data signal (without optical dispersion effects), a second piecewise linear frequency response of the spectrum envelope of a spectrum of an actual data signal (with optical dispersion effects) is measured or determined. Then, in the frequency domain, differences between the two piecewise linear frequency responses, e.g., the first piecewise linear frequency response and the second piecewise linear frequency response, are determined as a target or desired frequency response to be implemented by the EDC device; that is, the target frequency response of the EDC device is used to compensate or reduce the optical dispersion effects on the received electrical signal over the optical fiber.

By way of example, the first piecewise linear frequency response of the spectrum envelope of the ideal data signal of 10 Gb/s NRZ (e.g., 9.8 Gb/s PRBS7 data) without optical distortion effects, as shown in FIG. 2B, may be obtained by dividing a frequency band of 10 GHz into 10 divisions on an horizontal axis, for example, and then may be normalized to 0 Hz (e.g., relative response to 0 Hz) and gain frequency response, e.g., relative response to 0 Hz (dB) may be obtained. Table 1 below shows the first piecewise linear frequency of the spectrum envelope that is constructed over 10 GHz, based on the ideal spectrum envelope as shown in FIG. 2B.

TABLE 1

First Piecewise Envelope Response of Ideally Transmitted Data without Distortion

| | Freq. (GHz) | | | | | | | | | |
|---|---|---|---|---|---|---|---|---|---|---|
| | 1 | 2 | 3 | 4 | 5 | 6 | 7 | 8 | 9 | 10 |
| Relative response to 0 Hz (dB) | −1 | −2 | −3 | −4.5 | −7 | −12 | −17 | −22 | −32 | — |

Figure 16:
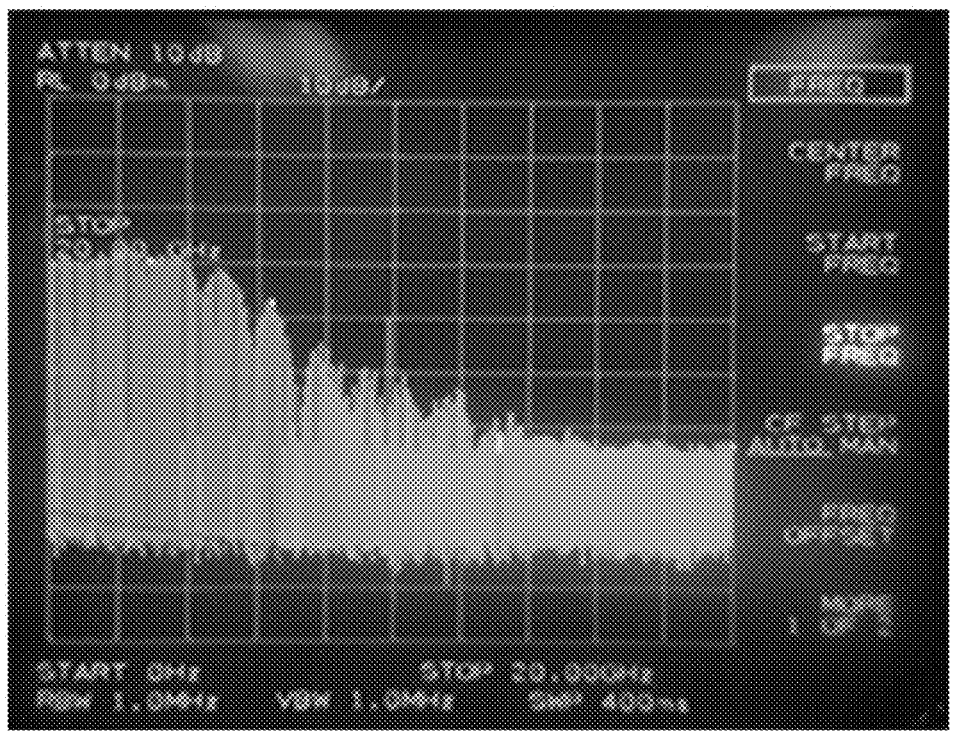
FIG. 16 is an example screen capture image of a spectrum envelope of an actual data signal over an optical fiber in accordance with an aspect of the present disclosure.

Having constructed the first piecewise linear frequency response of the spectrum envelop of the ideal data signal, one can proceed to obtain the second piecewise linear frequency response of the spectrum envelop of the actual received data signal over an optical fiber over a given distance. By way of example, after obtaining the first piecewise linear frequency response of the spectrum envelope of the ideal data signal, a spectrum of an actual data signal transmitted over an optical fiber by 1611 nm DML over a distance of 50 Km may be obtained, as shown in FIG. 16. It is noted that as can be seen in FIG. 16, the spectrum of the actual data signal is not smooth and may include many peaks and/or side lobes, due to the optical dispersion over the optical fiber over the distance. Note that as can be seen in FIG. 16, the spectrum envelope of the actual data signal over the optical fiber is quite different from the spectrum of the ideal data signal shown in FIG. 2B because of the optical dispersion over the optical fiber.

Based on the measured (or determined) spectrum envelope of the actual transmitted data over the optical fiber over the distance, the second piecewise linear frequency response of the spectrum envelope of the actual received data signal as shown in FIG. 16 may be constructed as shown in Table 2. In doing so, to obtain the second piecewise linear frequency response of the spectrum envelope of the actual received data signal, each peak of the measured spectrum may be interpolated to avoid abrupt response variations.

TABLE 2

Second Piecewise Envelope Response of Actual Transmitted Data

| | Freq. (GHz) | | | | | | | | | |
|---|---|---|---|---|---|---|---|---|---|---|
| | 1 | 2 | 3 | 4 | 5 | 6 | 7 | 8 | 9 | 10 |
| Relative response of 1611 nm 10 Gb/s over 50 km to 0 Hz (dB) | 0 | 2 | 2 | 1 | −2 | −5 | −10 | −15 | −20 | — |

Having determined the first piecewise linear frequency response of the spectrum envelope of the ideal data signal and the second piecewise linear frequency response of the spectrum envelop of the actual received data signal, a target frequency response for compensating the optical dispersion effects by the EDC device in the actual received data signal may be obtained by comparing the results tabulated in Table 1 and Table 2. By way of example, by subtracting the second piecewise envelop response in Table 1 from the first piecewise envelop response in Table 2, a difference in values of the two relative responses may be determined as the target frequency response over frequency divisions that is to be implemented by an EDC device. That is, the target frequency response of the EDC device or filter that is to be synthesized for equalizing or compensating the received electrical signal for the optical dispersion caused on the optical fiber over the distance. The EDC device may be placed between the TIA and the post amplifier in an optical receiver as shown in FIG. 1.

Table 3 illustrates such an example of the target frequency response that may be obtained by subtracting the result (or relative responses over the frequency divisions) of Table 2 from the result of Table 1.

TABLE 3

Target Frequency Response

| | Freq. (GHz) | | | | | | | | |
|---|---|---|---|---|---|---|---|---|---|
| 1 | 2 | 3 | 4 | 5 | 6 | 7 | 8 | 9 | 10 |

| Required response (dB) | | | | | | | | | |
|---|---|---|---|---|---|---|---|---|---|
| −1 | −4 | −5 | −5.5 | −5 | −7 | −7 | −7 | −12 | — |

Having determined the target frequency response of the EDC device that is to be synthesized or designed, the EDC device may now be implemented in various forms, e.g., a filter, using the passive electronic components. By way of example, the EDC device may be implemented as a RLC filter, having the desired target frequency response as shown in Table 3. As noted above, the RLC filter may include a plurality of resistors, a plurality of capacitors, a plurality of inductors, or a combination thereof. In the example, the EDC device may have a −3 dB low-pass filter like response at 3 GHz, keeping attenuation substantially the same up to 8 GHz. Thus, in the design of the EDC device having the target frequency response, a single filter may be designed and implemented using one or more resistors, inductors, and/or capacitors. Here, it is noted that the design of the filter having a specific characteristics based on the passive electronic components is conventional and thus not described in further detail.

In another implementation, the EDC device may be synthesized automatically. In other words, an automatic synthesis of functions of the EDC device may be implemented in the optical transceiver. This can be done at the optical transceiver, e.g., by a processing system 2013 in FIG. 20, by implementing one or more measuring function(s) of a spectrum response of a received signal and comparing function(s) of the measured spectrum response with a saved template response (or an ideal response without dispersion) of an ideal signal without dispersion effects, e.g., a template response based on a mathematical equation, such as $sinc^2$ ($\omega T/2$) function or the like, in a memory 2015 shown in FIG. 20.

Figure 17:
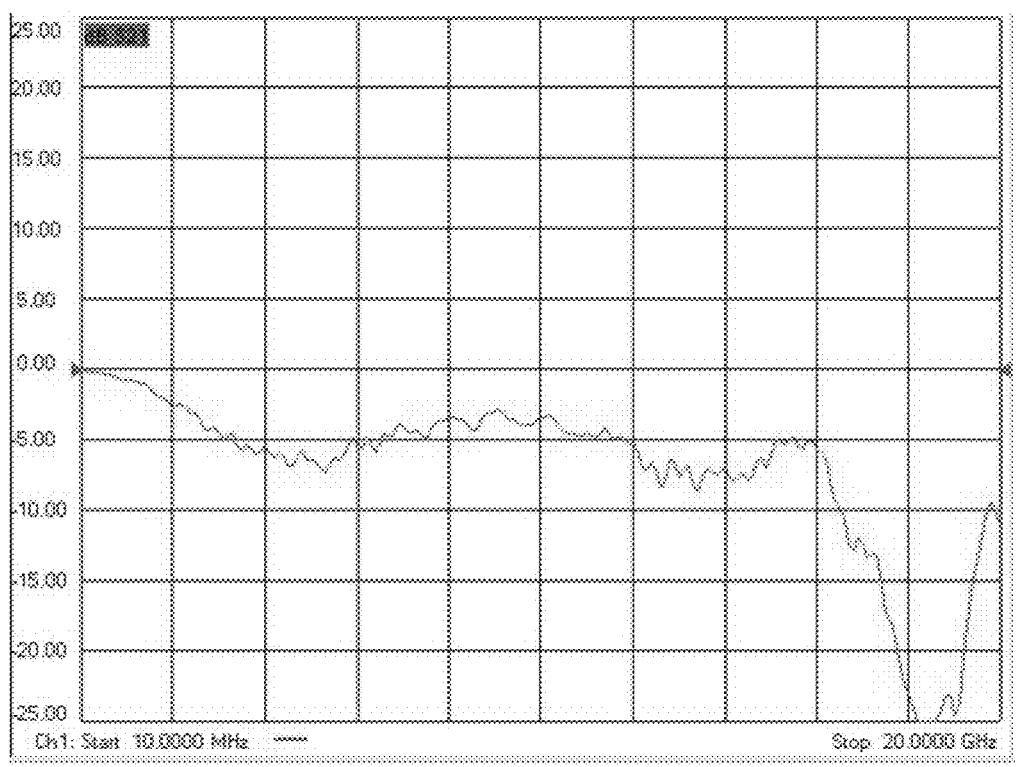
FIG. 17 is an example screen capture of an actual frequency response of an EDC device in accordance with an aspect of the present disclosure.
Figure 18A:
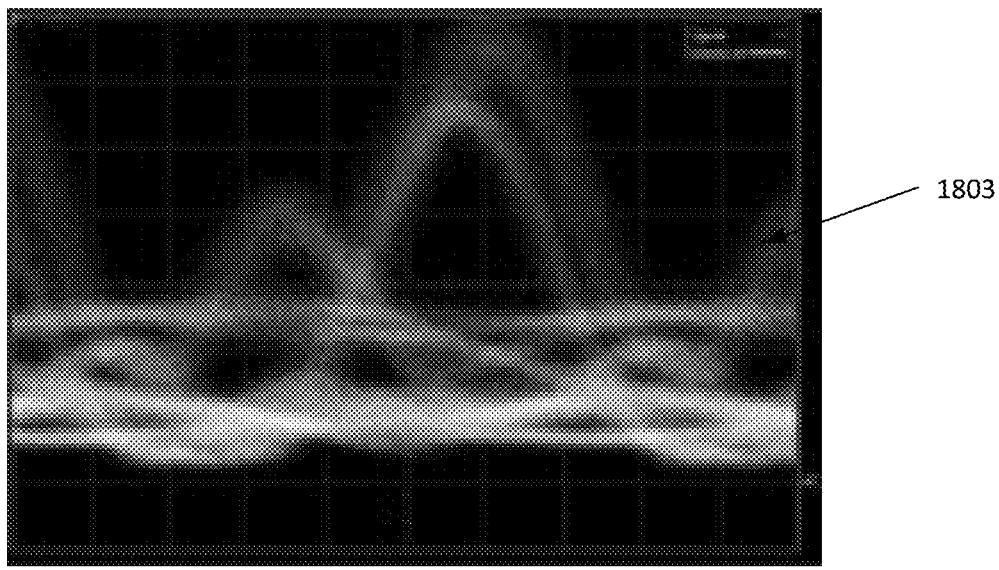
FIG. 18A is an example screen capture image of an eye diagram of a signal prior to the compensation by the EDC device.
Figure 18B:
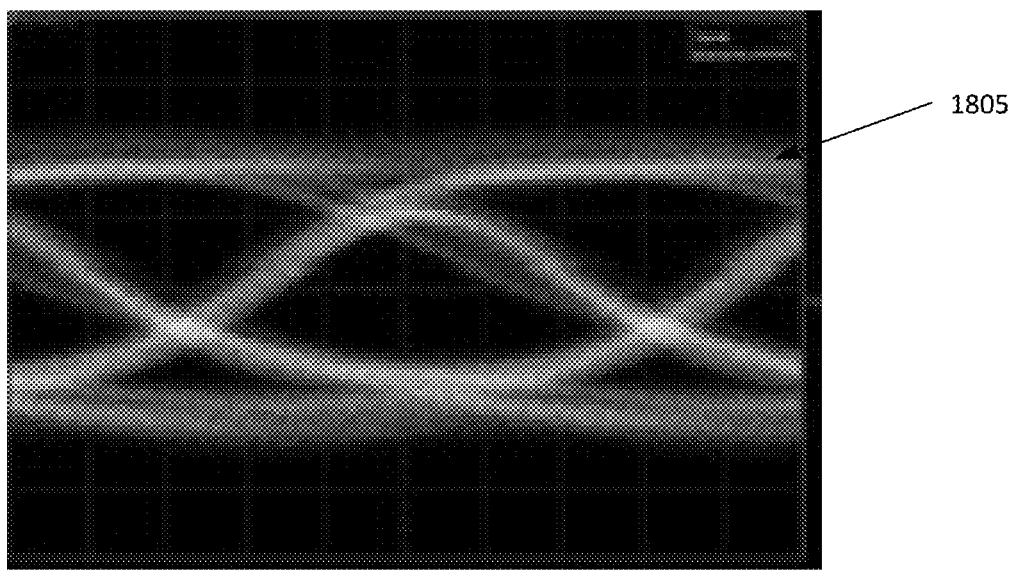
FIG. 18B is an example screen capture of an eye diagram of the signal after the compensation by the EDC device.

Alternatively, the EDC device may be designed and implemented as a composite filter having the target frequency response similar to that shown in Table 3. By way of example, FIG. 17 shows an actual frequency response of the designed EDC device in accordance with an aspect of the present disclosure. Further, FIG. 18A and FIG. 18B are images of screen captures illustrating effects of the compensation of the optical dispersion by the EDC device in accordance with an aspect of the present disclosure. FIG. 18A is an image of a screen capture of an eye diagram 1803 of an actual received signal prior to the compensation of the optical dispersion by the EDC device, and FIG. 18B is an image of a screen capture of an eye diagram 1805 of the actual received signal after the compensation of the optical dispersion by the EDC device. As can be seen in FIGS. 18A and 18B, the EDC device effectively equalizes or compensates the optical dispersion with a wide eye opening as shown in FIG. 18B. That is, a quick comparison of two eye diagrams shown in FIGS. 18A and 18B reveals that the equalized or compensated eye in FIG. 18B is quite widely open at the center of the eye compared to the eye in FIG. 18A, thereby greatly improving bit error rate (BER) performance of an optical receiver system when the EDC device is used. In the example, the EDC device includes a compensating RLC filter which is designed based on the target frequency response in Table 3, and has frequency characteristics shown in FIG. 17 for the actual transmitted signal by 1611 nm DML over the distance of 50 Km. The compensating RLC filter is a cost effective but powerful solution for reducing or compensating the optical dispersion effects on the received signals over optical transmission over distances.

Further, the first piecewise linear frequency response of the spectrum envelope of the ideal data signal and the second piecewise linear frequency response of the spectrum envelop of the actual received data signal, and/or the target frequency response may be stored in one or more look-up tables (LUTs) in one or more memories of an optical transceiver.

Further, it is noted that in the example, error free transmission may be obtained when input optical power to the receiver is set at −18 dBm as shown in FIG. 15A. In the example, the sensitivity measured with an avalanche photo diode (APD) optical receiver was around −20 dBm. The pulse width of the equalized eye has decreased, and as such, a crossing point of the eye has become lowered below 50%. This is a typical behavior of the optical signal affected by the dispersion of fiber when transmitted over a long fiber.

Figure 19:
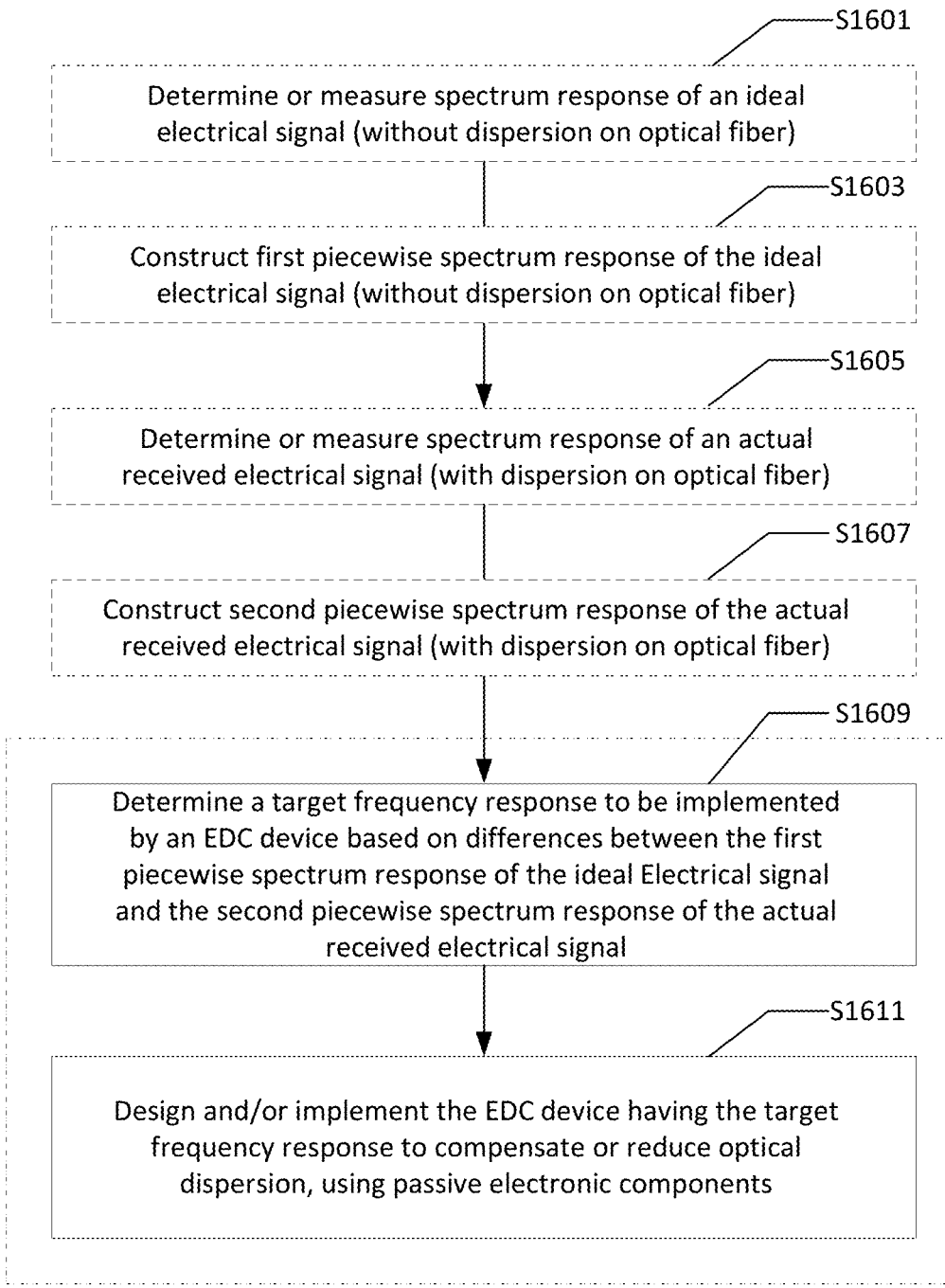
FIG. 19 is a flow chart for conceptually illustrating design of an EDC device in accordance with an aspect of the present disclosure.

FIG. 19 is a flow chart for conceptually illustrating design of an EDC device in accordance with an aspect of the present disclosure. The flow chart of FIG. 19 conceptually illustrates the above design and synthesis steps. First, at S1601, a spectrum (or frequency) response of an ideal electrical signal (without dispersion on the optical fiber) is optically determined or measured on a high-speed measurement device. The spectrum response of the ideal electrical signal may be performed by theoretical analysis, or alternatively, may be measured by using the high-speed measurement device with an oscilloscope display capability. The characteristics of the measured spectrum response may then be stored for later use in one or memories of an optical transceiver, for implementing some aspects of the present technology. Step S1601 may be done manually or automatically. In one implementation, the one or more processing systems of the optical transceiver may determine or measure the spectrum response of the ideal electrical signal without optical dispersion. Further, the spectrum response of the ideal electrical signal without optical dispersion may be stored for later use in one or more memories of the optical transceiver, for implementing some aspects of the present technology.

Based on the spectrum response of the ideal electrical signal, a first piecewise spectrum response of an ideal signal without dispersion effects of the optical fiber is optionally constructed at S1603. This step can be done manually or automatically. In one implementation, the one or more processing systems of the optical transceiver may construct the first piecewise spectrum response of the ideal signal without dispersion effects. Further, the first piecewise spectrum response of the ideal signal may be stored for later use in one or more memories of the optical transceiver, for implementing some aspects of the present technology.

At 1605, a spectrum (or frequency) response of an actual received electrical signal (with optical dispersion) is optionally determined or measured by a high-speed measurement device. The spectrum response of the actual received electrical signal with dispersion of the optical fiber may be measured manually in a controlled laboratory environment. That is, on the high-speed measurement device, the gain frequency response may be obtained over an optical fiber having a length of interest, that is, over a distance of interest. Alternatively, S1605 may be carried out automatically by the optical transceiver, and the measured spectrum response of the actual received electrical signal may be stored in one or more memories of the optical transceiver. Further, in another implementation, the spectrum response of the actual received electrical signal may be estimated based on certain information such as chirp information of a remote optical transmitter, transmission bandwidth, etc. S1605 may be done manually or automatically. In one implementation, the one or more processing systems of the optical transceiver may determine or measure the spectrum (or frequency) response of the actual received electrical signal (with optical dispersion).

At S1607, based on the determined or measured spectrum response of the actual received electrical signal with optical dispersion on the optical fiber of a length, a second piecewise spectrum response of the actual received signal with dispersion effects of the optical fiber is optically constructed. S1607 may be done manually or automatically. In one implementation, the one or more processing systems of the optical transceiver may construct the second piecewise spectrum response of the actual received signal with dispersion effects of the optical fiber, based on the determined or measured spectrum response of the actual received electrical signal with optical dispersion on the optical fiber of a length. Further, the second piecewise spectrum response of the actual received signal may be stored in one or more memories of the optical transceiver.

At S1609, a target frequency response that is to be implemented by an EDC device is determined based on differences between the first piecewise spectrum response of the ideal electrical signal and the second piecewise spectrum response of the actual received electrical signal. The EDC device may have the target frequency response or an inverse of the target frequency response to compensate or reduce the effects of optical dispersion in the actual received electrical signal. This step can be done manually or automatically. In one implementation, the one or more processing systems of the optical transceiver may determine the target frequency response. Further, the target frequency response may be stored for later use in one or more memories of the optical transceiver.

At S1611, using the passive electronic components, the EDC device having the target frequency response or the inverse of the target frequency response is designed and/or implemented. The EDC device may include RLC filters or various combinations thereof, so as to compensate or reduce the effects of the optical dispersion of the optical fiber present in the actual received electrical signal, in accordance with various aspects of the present disclosure. The EDC device may be configured to be disposed to couple to the transimpedance amplifier in the optical transceiver.

As noted above, the EDC device may be implemented using three building blocks, for example, such as a low-pass filter block, an attenuation block and/or a notch filter block, based on the passive electronic components. By way of example, an example implementation of the EDC device or filter shown in FIG. 7 or FIG. 17 may require a low-pass filter function to have a roll-off at a high frequency, an attenuation function to reduce gain at other low frequency and high frequency, for compensating effects of optical dispersion as seen in the frequency response, by means of adding an inductor (L) or a capacitor (C) component to get a higher gain at a frequency of interest as the frequency increases and/or a notch filter to eliminate unnecessary frequency components at other high frequencies. Different values of resistance, inductance, and capacitance may be tried to get a gain frequency response as close to an ideal gain frequency response without the effects of the optical dispersion. Further, in the present example implementations, resistors with fixed resistance, inductors with fixed inductance, and/or capacitors with fixed capacitance are used, but the implementation of the present technology may not be limited thereto. As such, in another implementation, resistors, inductors, and/or capacitors having variable resistance, variable inductance, variable capacitance, respectively, may be used, and various aspects of the present technology may be designed and implemented in real-time in one or more optical transceivers, under various deployment conditions.

Further, in an aspect of the present disclosure, to control the roll-off of the frequency response, a low-pass filter block may be used and may be needed for eliminating 10 GHz component or high frequency components generated by dispersion effects, as shown in FIG. 7. As noted above, these high frequency components may be generated by interaction(s) between a wavelength change of a laser when it is modulated and the dispersive characteristics of the single mode fiber used as a transmission medium for light signal transmission. Thus, the low-pass filter may be used to eliminate noise components existing in a signal channel, especially noise components in the high frequency region.

Further, when a bandwidth of a TIA front-end in an optical receiver is very wide compared to a bandwidth needed for an optimum bandwidth needed, an EDC device or filter may be synthesized carefully to have the optimum bandwidth and the roll-off without distortion to the signal received. Accordingly, a filter type for the EDC device may need be chosen carefully, and a Bessel type filter may be used since Bessel filters are widely used in fiber optic communications due to its maximally flat phase response.

Furthermore, when the bandwidth of the optical receiver is limited by the TIA front-end, or when the overall bandwidth of the optical channel is not wide, the low pass filter may not be used since the frequency response of the TIA front-end is regarded as that of a low pass type filter. The low pass characteristics may be adopted to eliminate the high frequency components generated by the dispersion on the optical fiber. Sometimes, the bandwidth of the TIA front-end used may be smaller than a bit rate frequency, and thus the bandwidth of the TIA front-end may be modified to have the optimum bandwidth and/or to have a required shape of a frequency response.

Furthermore, it is noted that the present technology is different from a simple implementation of a flat frequency response and bandwidth required for obtaining an optimum eye opening using typical Continuous Time Linear Equalizer (CTLE) type equalizer. CTLE type equalizer is typically implemented in a limiting or post amplifier or receiver output or transmitter input to compensate RF signal loss caused by transmission lines. In an aspect of the present disclosure, however, the EDC device is implemented outside the limiting or post amplifier, using the passive electronic components, e.g., resistors, inductors, and/or capacitors. As described above, the frequency response required to compensate for the optical dispersion is relatively simple and have different frequency response shapes from a typical CTLE implementation in a commercially available limiting, post amplifier. Also, the present technology offers many benefits including savings in costs and increased effectives over the existing technologies such as the CTLE technologies in the commercially available limiting post amplifier in the optical receiver.

Figure 20:
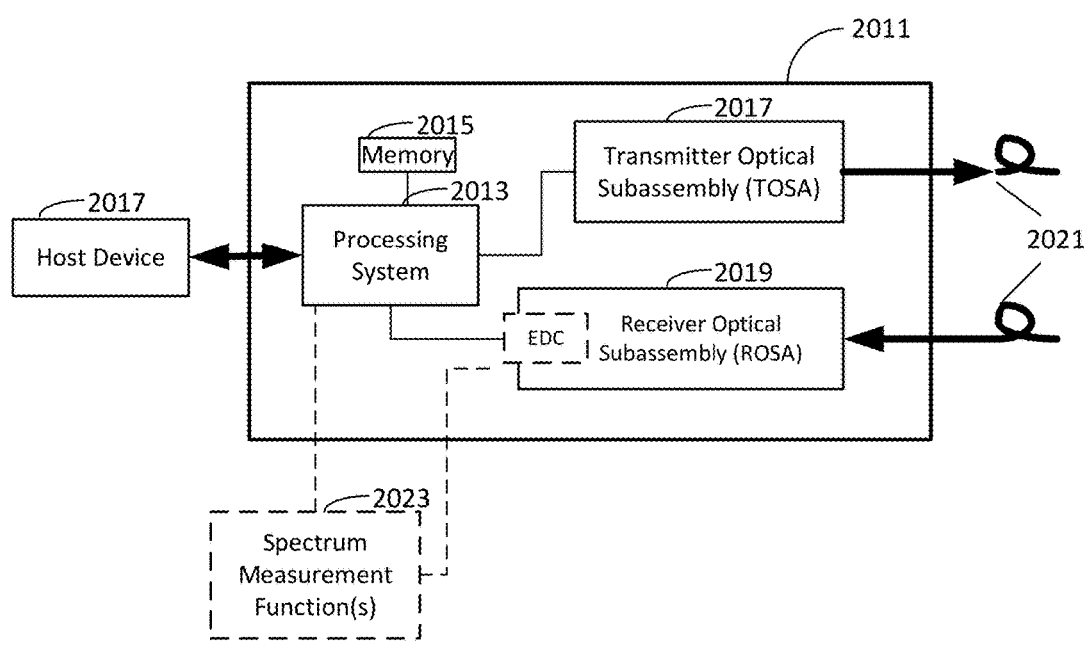
FIG. 20 is an example diagram conceptually illustrating an optical transceiver in accordance with an aspect of the present disclosure.

FIG. 20 is a diagram conceptually illustrating an optical transceiver 2011 in accordance with an aspect of the present disclosure. The optical transceiver 2011 includes a processing system 2013, a memory 2015, a transmitter optical subassembly (TOSA) 2017, and a receiver optical subassembly (ROSA) 2019. The optical transceiver 2011 may include other components and subsystems but descriptions thereof have been omitted herein for the simplicity purposes.

The processing system 2013 may include one or more processors and may be configured to control and manage operation of the optical transceiver 2011, among other functions. The processing system 2013 may also communicate with a host device 2027 for transmission and reception of data that is to be transmitted over an optical fiber 2021 to a remote side. Further, the processing system 2013 may be configured to implement various function including some or all the steps of FIG. 6 and/or FIG. 19. Furthermore, the processing system 2013 may be implemented as one or more processors, one or more field programmable gate arrays (FPGAs), hardware logic, or the like. Also, the processing system 2013 may be coupled to one or more external memories 2015 for storing various parameters and/or code relating to control and management of the optical transceiver 2011 as well as implementing various functions relating to the present technology disclosed herein. Further, the processing system 2013 may include one or more internal memories for storing various parameters including values representing spectrum characteristics of an ideal data signal. The processing system 2013 may be further configured to communicate with an external device such as the host device 2017 via various interfaces including an I2C interface or the like.

The TOSA 2017 of the optical transceiver 2011 is configured to receive an electrical signal including data from the host device and convert the received electrical signal into an optical signal for transmission over an optical fiber channel 2021. As such, the TOSA 2017 may include a laser diode, e.g., DML, an electrical interface and an optical interface, and may also include various filter elements and isolators depending upon needed functionality. The ROSA 2019 of the optical transceiver 2011 is configured to receive an optical signal from the optical fiber channel 2021 and convert the received optical signal into an electrical signal for processing. As such, the ROSA 2019 may include a photodiode, an optical interface, an electrical interface, as well as an EDC device. Further, in another implementation, the functionalities of the TOSA 2017 and ROSA 2019 may be combined into one and may be implemented as a directional optical subassembly (BOSA).

Further, the optical transceiver 2011 of FIG. 20 may be optionally coupled to a device including spectrum measurement function(s) 2023. The spectrum measurement function(s) 2023 may be a separate device such as a high-speed measurement device or any circuit or chip or the like implementing the spectrum measurement function(s) 2023. The spectrum measuring functions(s) 2023 may include one or more functions relating to determining or measuring one or more spectral responses of an ideal data signal, an actual received signal, comparing the one or more spectral responses of the ideal data signal and the actual received signal, and/or determining a target frequency response that is to be implemented by the EDC device to reduce optical dispersion effects on optical fiber over distances. Further, the spectrum measurement function(s) 2023 may also be implemented as one or more functions in or by the processing system 2013 or in combination with the ROSA 2019 in the optical transceiver 2011. Furthermore, the spectrum measurement function(s) 2023 may also be implemented as part of the ROSA 2019.

In another aspect of the present disclosure, the present technology may be implemented by monitoring input optical power to an optical receiver of the optical transceiver 2011. When a signal is received at an optical receiver, the input optical power to the optical receiver may be monitored by the optical receiver, and the distance of optical transmission over optical fiber may be estimated, e.g., the transmission distance from the other side over the optical fiber. Given the estimated transmission distance and the wavelength information, the EDC device may be designed and implemented in the optical receiver at the receiving end to reduce or mitigate the effects of optical dispersion. Alternatively, in another implementation, an optical transmitter at the other end of the optical fiber may communicate with the optical receiver at the receiving end certain information, such as a transmission distance, wavelength, data rate, etc. such that the optical receiver at the receiving end may configure the EDC device to reduce or mitigate the effects of optical dispersion at the receiving end. That is, the present technology may be implemented based on received certain information such as output power information or transmission distance from a remote optical transceiver or system, and/or from a local system at the other end of the optical fiber. The received information may be used to configure the EDC device, in accordance with an aspect of the present disclosure, to reduce or mitigate the effects of optical dispersion in received signals from the remote optical transceiver or system.

Further, in another aspect of the present disclosure, a first optical transceiver may be located at a remote side and may transmit certain information over optical fiber to a second optical transceiver. The certain information may include a chirp parameter of the first optical transceiver. Based on the received chirp parameter, the second optical transceiver (or an optical receiver) may estimate an optical transmission distance and estimate an amount of optical dispersion, e.g., an amount of eye closure due to the optical dispersion. Based on the estimated amount of the optical dispersion, the EDC device may be configured or implemented, in accordance with an aspect of the present disclosure, to reduce and/or mitigate the effects of the optical dispersion over the distance between the first optical transceiver and the second optical transceiver.

Furthermore, the present technology may also be implemented using one or more micro strip lines, microwave integrated circuits, etc. which may replace some or all the components of an RLC arrangement of the EDC device. For example, in an aspect of the present disclosure, inductors and/or capacitors may be replaced by one or more micro strip lines, thereby further reducing the cost of the designing and implementing the EDC device. Furthermore, in another implementation, the EDC device may also be designed and implemented as a microwave integrated circuit (MIC) so as to enable cost-effective mass implementation of the EDC device in the optical transceivers. Furthermore, in another implementation, the EDC device as described herein may also be designed and implemented using active components including field effect transistors (FETs), or the like, or any combination of the active components and the passive components. Also, the EDC device may be implemented as one or more integrated circuits (ICs) or chips.

Figure 21:
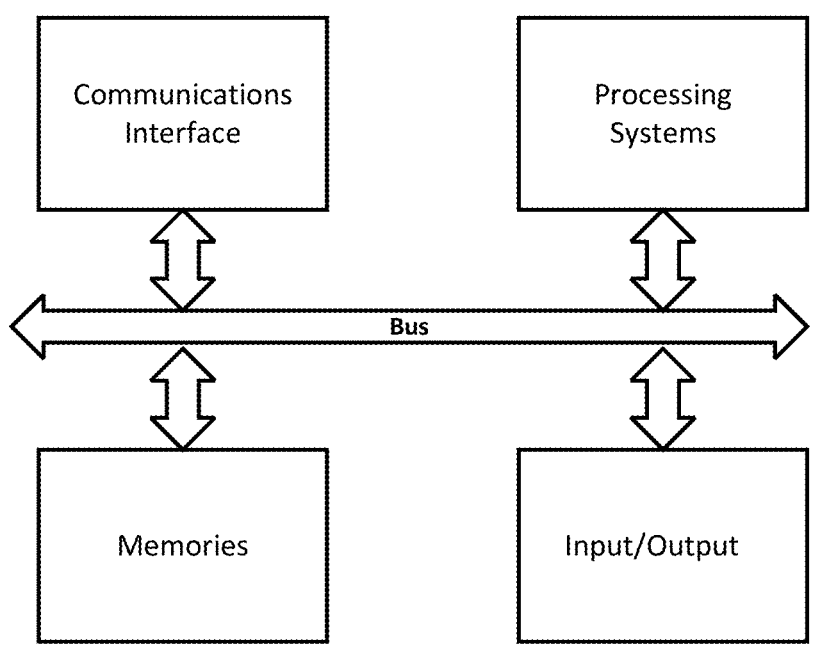
FIG. 21 is an example diagram conceptually illustrating a system with a bus architecture in accordance with an aspect of the present disclosure.

FIG. 21 is a diagram conceptually illustrating a bus based communication system that may be found in an optical transceiver, for example, the optical transceiver 2011 or the like. The bus may link together various circuits, including one or more processing systems (or processors), one or more memories, one or more communication interfaces, and/or one or more input/output devices.

The one or more processing systems, e.g., the processing system 2013 in FIG. 20, may be responsible for managing the bus and general processing, including the executing of software stored on a non-transitory computer-readable medium. As noted, the one or more processing systems may include one or more processors, such as microprocessors, microcontrollers, or the like that are configured to interpret and execute instructions. In other implementations, the one or more processing systems may be implemented as or include one or more application specific integrated circuits (ASICs), field programmable gate arrays (FPGAs), gate arrays, logic arrays, or the like. The software, when executed by the one or more processing systems or processors, may cause the one or more processing systems to perform the various functions described herein for any particular apparatus. The non-transitory computer-readable medium may also be used for storing data that is manipulated by the one or more processing systems when executing software. The one or more memories, e.g., memory 2015 in FIG. 20, may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems, including optical transceivers (e.g., TOSA 2017 and/or ROSA 2019 in FIG. 20). The one or more input/output devices may include devices that permit inputting information and/or outputting information to an operator.

As noted above, the present technology, in accordance with various aspects of the present disclosure, may be implemented in variety of form factors, including small form-factor pluggable (SFP), SFP+, C form-factor pluggable (CFP), 10 Gigabit small form-factor pluggable (XFP), XFP+, or the like. These form-factors define various parameters such as the physical size, shape, power requirements, etc. of optical transceivers. The term "Small Form-Factor (SFP)" or "SFP module" or others like it as used herein refers to a specification for optical transceiver or optical modular transceivers, which are designed for use with small form factor connectors and may be hot-swappable devices. By way of example, the SFP modules may be multi-source agreement (MSA) compliant and allow for optical and/or electrical interfaces, converting the electrical signals to optical signals, vice versa, and may be available for use with a variety of media, such as copper media, optical fiber (e.g., multimode optical fiber, or single mode optical fiber), etc. Generally, an existing SFP module may be used to plug into a port of a network switch and connect to a fiber channel and Gigabit Ethernet (GbE) optical fiber cables at another location thereon. Thus, the existing SFP module may enable the same electrical port on the network switch to connect to different types of optical fibers, including multi-mode or single-mode fibers.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of a processing system may include microcontroller(s), microprocessor(s), digital signal processors (DSPs), discrete hardware circuit(s), gated logic, state machine(s), programmable logic devices (PLDs), FPGAs, and other suitable hardware configured to perform various functions described herein. The term "software" used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

While for the purpose of simplicity some aspects of the present technology are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein.

As used in the present disclosure, except explicitly noted otherwise, the term "comprise" and variations of the term, such as "comprising," "comprises," and "comprised", as well as the term "include" and its variations, such as "including," "includes," and "included" are not intended to exclude other additives, components, integers or steps.

The terms "first," "second," and so forth used herein may also be used to describe various components, but the components are not limited by the above terms. The above terms are used only to discriminate one component from other components, without departing from the scope of the present disclosure. Also, the term "and/or" used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical receiver comprising:
    a photodiode operable to receive an optical signal and produce an electrical signal;
    a transimpedance amplifier (TIA) operable to receive the electrical signal and produce a first amplified signal; and
    an electronic dispersion compensation (EDC) device operable to receive the first amplified signal from the TIA and produce a compensated signal, the EDC device comprising passive electronic components having an arrangement with a particular frequency response so as to compensate optical dispersion in the first amplified signal, at least some of the plurality of passive electronic components forming a low-pass or high-pass filter, an attenuator, or a notch filter,
    wherein the EDC device is configured to compensate the optical dispersion on the received first amplified signal using either a time domain analysis or a frequency domain analysis and use frequency response characteristics of an ideal data signal without optical dispersion as a reference template.

2. The optical receiver of claim 1, wherein the passive electronic components comprise at least one resistor, a capacitor, or an inductor.

3. The optical receiver of claim 1, wherein values of the passive electronic components are selected based on one or more differences between a frequency response of a data signal without optical dispersion and a frequency response of the data signal with the optical dispersion, such that the optical dispersion is substantially reduced by the arrangement of the passive electronic components in the compensated signal.

4. The optical receiver of claim 1, wherein the notch filter comprises a parallel resonator or a serial resonator.

5. The optical receiver of claim 1, wherein the attenuator comprises a T-type attenuator, a bridge T-type attenuator, or a PI-type attenuator.

6. The optical receiver of claim 1, further comprising a post amplifier operable to receive the compensated signal and produce a second amplified signal for processing.

7. The optical receiver of claim 1, wherein the optical receiver is configured to be operable in a form-factor including small form-factor pluggable (SFP), SFP+, C form-factor pluggable (CFP), 10 Gigabit small form-factor pluggable (XFP), or XFP+.

8. An optical transceiver, comprising:
    a transmitter optical subassembly (TOSA) configured to receive a first electrical signal and convert the received first electrical signal into a first optical signal for transmission over an optical fiber;
    a receiver optical subassembly (ROSA) configured to receive a second optical signal over the optical fiber and convert the received second optical signal into a second electrical signal, wherein the ROSA comprises:
    a photodiode operable to receive the second optical signal and produce the second electrical signal;
    a transimpedance amplifier (TIA) operable to receive the second electrical signal and produce an amplified signal; and
    an electronic dispersion compensation (EDC) device operable to receive the amplified signal from the TIA and produce a compensated signal,
    wherein the EDC device comprises passive electronic components having an arrangement with a particular frequency response so as to compensate optical dispersion in the first amplified signal, at least some of the plurality of passive electronic components forming a low-pass or high-pass filter, an attenuator, or a notch filter,
    wherein the EDC device is configured to compensate the optical dispersion on the received first amplified signal using either a time domain analysis or a frequency domain analysis and use frequency response characteristics of an ideal data signal without optical dispersion as a reference template.

9. The optical transceiver of claim 8, wherein the attenuator comprises a T-type attenuator, a bridge T-type attenuator, or a PI-type attenuator.

10. A method of compensating optical dispersion in a signal transmitted by a direct modulated laser in a remote optical transmitter, the method comprising:
    receiving and converting, at an optical receiver, an optical signal into an electrical signal, the optical signal being transmitted over an optical fiber by the remote optical transmitter;
    amplifying the electrical signal into an amplified electrical signal;
    using frequency response characteristics of an ideal data signal without optical dispersion as a reference template, and
    compensating, by an electronic dispersion compensation (EDC) device, the effects of optical dispersion in the amplified electrical signal, based on the frequency response characteristics of an ideal data signal without optical dispersion as the reference template, wherein the EDC device comprises an arrangement of passive electronic components comprising at least a high-pass or low-pass filter, an attenuator, or a notch filter, the passive electronic components including at least one resistor, a capacitor, or an inductor.

11. The method of claim 10, further comprising:
    determining a frequency response of the amplified electrical signal including the effects of optical dispersion; and
    determining a target frequency response of the EDC device such that that the target frequency response of the EDC device is configured to compensate the effects of optical dispersion in the amplified electrical signal.

* * * * *